US012786962B2

(12) United States Patent
Luo et al.

(10) Patent No.: US 12,786,962 B2
(45) Date of Patent: *Nov. 3, 2026

(54) WLAN SYSTEM RESOURCE INDICATION METHOD AND APPARATUS

(71) Applicant: HUAWEI TECHNOLOGIES CO., LTD., Shenzhen (CN)

(72) Inventors: Jun Luo, Shanghai (CN); Jiayin Zhang, Shanghai (CN); Jiyong Pang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 247 days.

This patent is subject to a terminal disclaimer.

(21) Appl. No.: 18/798,647

(22) Filed: Aug. 8, 2024

(65) Prior Publication Data

US 2025/0048338 A1 Feb. 6, 2025

Related U.S. Application Data

(63) Continuation of application No. 18/485,213, filed on Oct. 11, 2023, now Pat. No. 12,114,295, which is a (Continued)

(30) Foreign Application Priority Data

Apr. 30, 2015 (WO) ................ PCT/CN2015/077912
Jun. 18, 2015 (WO) ................ PCT/CN2015/081859

(51) Int. Cl.
*H04W 72/044* (2023.01)
*H04B 7/06* (2006.01)
(Continued)

(52) U.S. Cl.
CPC ......... *H04W 72/044* (2013.01); *H04L 5/0007* (2013.01); *H04L 5/003* (2013.01);
(Continued)

(58) Field of Classification Search
CPC ... H04B 7/0617; H04B 7/0669; H04L 5/0007; H04L 5/0094; H04W 72/044; H04W 72/04; H04W 84/12; H04W 88/08
See application file for complete search history.

(56) References Cited

U.S. PATENT DOCUMENTS

| | | | |
|---|---|---|---|
| 7,477,621 | B1 | 1/2009 | Loc et al. |
| 10,375,679 | B2 | 8/2019 | Chu et al. |

(Continued)

FOREIGN PATENT DOCUMENTS

| | | | |
|---|---|---|---|
| CN | 101252776 A | 8/2008 | |
| CN | 102007746 A | 4/2011 | |

(Continued)

OTHER PUBLICATIONS

Kiseon Ryu, UL MU Procedure, IEEE 802.11-15/0365r0, Mar. 9, 2015, 16 pages.

(Continued)

*Primary Examiner* — Brian P Cox

(57) ABSTRACT

A WLAN system resource indication method and apparatus are provided. The method includes: generating, by an access point, a frame that carries resource indication information; and sending, to multiple stations, the frame that carries the resource indication information. The resource indication information includes multiple pieces of sub resource indication information. Correspondingly, each piece of the sub resource indication information uniquely corresponds to one of the multiple stations. Therefore, a station side does not need read the entire resource indication information, so as to reduce resource overheads and improve efficiency.

36 Claims, 7 Drawing Sheets

Related U.S. Application Data continuation of application No. 17/500,888, filed on Oct. 13, 2021, now Pat. No. 11,818,690, which is a continuation of application No. 16/847,558, filed on Apr. 13, 2020, now Pat. No. 11,178,659, which is a continuation of application No. 15/795,584, filed on Oct. 27, 2017, now Pat. No. 10,624,085, which is a continuation of application No. PCT/CN2015/094493, filed on Nov. 12, 2015.

(51) Int. Cl.

| | |
|---|---|
| ***H04L 5/00*** | (2006.01) |
| ***H04W 72/04*** | (2023.01) |
| ***H04W 84/12*** | (2009.01) |
| ***H04W 88/08*** | (2009.01) |

(52) U.S. Cl.

CPC ........... *H04L 5/0094* (2013.01); *H04W 72/04* (2013.01); *H04B 7/0617* (2013.01); *H04B 7/0669* (2013.01); *H04W 84/12* (2013.01); *H04W 88/08* (2013.01)

(56) References Cited

U.S. PATENT DOCUMENTS

| | | | |
|---|---|---|---|
| 10,389,563 | B2 | 8/2019 | Chen et al. |
| 2009/0247202 | A1 | 10/2009 | Jang et al. |
| 2011/0299468 | A1 | 12/2011 | Van Nee et al. |
| 2012/0039266 | A1 | 2/2012 | Abraham et al. |
| 2012/0106371 | A1 | 5/2012 | Abraham et al. |
| 2012/0106417 | A1 | 5/2012 | Spero et al. |
| 2012/0120931 | A1 | 5/2012 | Abraham et al. |
| 2012/0213308 | A1 | 8/2012 | Merlin et al. |
| 2013/0010708 | A1 | 1/2013 | Abraham et al. |
| 2013/0058273 | A1 | 3/2013 | Wentink et al. |
| 2013/0070642 | A1 | 3/2013 | Kim et al. |
| 2013/0070670 | A1 | 3/2013 | Wentink |
| 2013/0070701 | A1 | 3/2013 | Merlin et al. |
| 2013/0286959 | A1 | 10/2013 | Lou et al. |
| 2013/0301605 | A1 | 11/2013 | Kim et al. |
| 2013/0329620 | A1 | 12/2013 | Kim et al. |
| 2014/0112264 | A1 | 4/2014 | Bao et al. |
| 2014/0126509 | A1 | 5/2014 | You |
| 2014/0140312 | A1 | 5/2014 | Lee et al. |
| 2014/0169356 | A1 | 6/2014 | Noh et al. |
| 2014/0241458 | A1 | 8/2014 | Zhang et al. |
| 2014/0293916 | A1 | 10/2014 | Sohn et al. |
| 2014/0307602 | A1 | 10/2014 | Seok |
| 2015/0023291 | A1 | 1/2015 | Lee et al. |
| 2015/0063291 | A1 | 3/2015 | Merlin et al. |
| 2015/0085732 | A1 | 3/2015 | Bao et al. |
| 2015/0124680 | A1 | 5/2015 | Kang et al. |
| 2015/0250003 | A1 | 9/2015 | Seok et al. |
| 2015/0311964 | A1 | 10/2015 | Sohn et al. |
| 2016/0088489 | A1 | 3/2016 | Abraham et al. |
| 2016/0156438 | A1 | 6/2016 | Sun et al. |
| 2016/0226638 | A1 | 8/2016 | Azizi et al. |
| 2016/0255656 | A1 | 9/2016 | Lou et al. |
| 2016/0295581 | A1 | 10/2016 | Ghosh et al. |
| 2016/0330300 | A1 | 11/2016 | Josiam et al. |
| 2018/0138959 | A1 | 5/2018 | Chun et al. |
| 2019/0052353 | A1 | 2/2019 | Kim et al. |

FOREIGN PATENT DOCUMENTS

| | | | |
|---|---|---|---|
| CN | 102013959 | A | 4/2011 |
| CN | 102036387 | A | 4/2011 |
| CN | 102196574 | A | 9/2011 |
| CN | 102447539 | A | 5/2012 |
| CN | 102550089 | A | 7/2012 |
| CN | 102687422 | A | 9/2012 |
| CN | 102696182 | A | 9/2012 |
| CN | 102859897 | A | 1/2013 |
| CN | 102870342 | A | 1/2013 |
| CN | 102884857 | A | 1/2013 |
| CN | 102948091 | A | 2/2013 |
| CN | 102948123 | A | 2/2013 |
| CN | 102959998 | A | 3/2013 |
| CN | 102986263 | A | 3/2013 |
| CN | 103069737 | A | 4/2013 |
| CN | 103098402 | A | 5/2013 |
| CN | 103202085 | A | 7/2013 |
| CN | 103314629 | A | 9/2013 |
| CN | 103348742 | A | 10/2013 |
| CN | 103404187 | A | 11/2013 |
| CN | 103430601 | A | 12/2013 |
| CN | 103444117 | A | 12/2013 |
| CN | 103491644 | A | 1/2014 |
| CN | 103814604 | A | 5/2014 |
| CN | 103828265 | A | 5/2014 |
| CN | 104467931 | A | 3/2015 |
| CN | 108964858 | A | 12/2018 |
| EP | 2670075 | A1 | 12/2013 |
| EP | 2741431 | A2 | 6/2014 |
| EP | 3219041 | B1 | 9/2017 |
| JP | 2013509106 | A | 3/2013 |
| JP | 2013516125 | A | 5/2013 |
| JP | 2018511222 | A | 4/2018 |
| KR | 20090064815 | A | 6/2009 |
| KR | 20110077612 | A | 7/2011 |
| KR | 20120073221 | A | 7/2012 |
| WO | 2011106945 | A1 | 9/2011 |
| WO | 2012046951 | A1 | 4/2012 |
| WO | 2012087539 | A1 | 6/2012 |
| WO | 2012173326 | A1 | 12/2012 |
| WO | 2017011274 | A1 | 1/2017 |
| WO | 2017030342 | A1 | 2/2017 |

OTHER PUBLICATIONS

Shahmaz Azizi, OFDMA Numerology and Structure, IEEE 802.11-15/0330r1, Mar. 9, 2015, 38 pages.

Robert Stacey(Intel):"Specification Framework for Tgax", IEEE P802.11 Wireless LANs, IEEE 802.11-15/0132r9, Sep. 22, 2015, total 34 pages.

Robert Stacey(Intel):"Specification Framework for Tgax", IEEE P802.11 Wireless LANs, IEEE 802.11-15/0132r15, Jan. 28, 2016, total 43 pages.

Robert Stacey(Intel):"Specification Framework for Tgax", IEEE P802.11 Wireless LANs, IEEE 802.11-15/0132r16, Mar. 17, 2016, total 49 pages.

Young Hoon Kwon (Newracom) et al. SIG Structure for UL PPDU, IEEE 802.11-15/0574r0, May 11, 2015, total 17 pages.

Young Hoon Kwon (Newracom) et al. SIG-B Field for HEW PPDU, IEEE 802.11-15/0805r2, Jul. 13, 2015, total 11 pages.

Reza Hedayat (Newracom) et al. Uplink ACK and BA Multiplexing, IEEE 802.11-15/0829r2, Jul. 2015, total 20 pages.

Simone Merlin (Qualcomm) et al. Trigger Frame Format, IEEE 802.11-15/0877r1, Jul. 2015, total 15 pages.

Kaushik Josiam (Samsung) et al. HE-SIG-B Contents, IEEE 802.11-15/1066r0, Sep. 2015, total 25 pages.

Le Liu (Huawei) et al. HE-SIG-B Contents, IEEE 802.11-15/1335r2, Nov. 9, 2015. total 23 pages.

Simone Merlin (Qualcomm) et al. Trigger Frame Content, IEEE 802.11-15/1344r1, Nov. 2015, total 19 pages.

Jun Luo (Huawei) et al. RU Signaling in Trigger Frame, IEEE 802.11-16/0383r0, Mar. 2016, total 16 pages.

Certified copy of priority document PCT/KR2016/008975 of U.S. Appl. No. 62/213,125, Aug. 23, 2016, total 32 pages.

Certified copy of priority document PCT/US2016/041397 of U.S. Appl. No. 62/191,078, filed Jul. 21, 2016, total 71 pages.

Dorothy Stanley (Aruba Networks) et al.: "2nd Vice Chair Report Mar. 2015", IEEE 802.11-15/0223r0, Mar. 2015. total 22 pages.

IEEE 802.11-15/0877r0, Simone Merlin, Qualcomm, Trigger Frame Format, Jul. 2015, total 14 pages.

IEEE 802.11-15/1312r1, Reza Hedayat, Newracom, MU BAR Frame Format, Nov. 2015, total total 14 pages.

IEEE 802.11-15/1344r1, Simone Merlin, Qualcomm, Trigger Frame Content, Nov. 2015, total 19 pages.

WLAN SYSTEM RESOURCE INDICATION METHOD AND APPARATUS

CROSS-REFERENCE TO RELATED APPLICATIONS

This application is a continuation of U.S. patent application Ser. No. 18/485,213, filed on Oct. 11, 2023, which is a continuation of U.S. patent application Ser. No. 17/500,888, filed on Oct. 13, 2021, now U.S. Pat. No. 11,818,690, which is a continuation of U.S. patent application Ser. No. 16/847,558, filed on Apr. 13, 2020, now U.S. Pat. No. 11,178,659, which is a continuation of U.S. patent application Ser. No. 15/795,584, filed on Oct. 27, 2017, now U.S. Pat. No. 10,624,085, which is a continuation of International Application No. PCT/CN2015/094493, filed on Nov. 12, 2015, which claims priority to International Patent Application No. PCT/CN2015/081859, filed on Jun. 18, 2015, and International Patent Application No. PCT/CN2015/077912, filed on Apr. 30, 2015. All of the afore-mentioned patent applications are hereby incorporated by reference in their entireties.

TECHNICAL FIELD

The present invention relates to communications technologies, and in particular, to a WLAN system resource indication method and apparatus.

BACKGROUND

With development of the mobile Internet and popularization of intelligent terminals, data traffic increases explosively. A Wireless Local Area Network (WLAN) becomes one of current mainstream mobile broadband access technologies due to advantages in a high speed and low costs of the wireless local area network. In a next-generation WLAN system 802.11ax, an orthogonal frequency division multiple access (OFDMA) technology may be introduced to improve system resource usage. Specifically, the OFDMA technology may be used to simultaneously allocate different channel resources to different users, so that multiple users efficiently access a channel, thereby improving channel usage. For the WLAN, introduction of the OFDMA technology may enable an access point (AP) to perform uplink and downlink transmission for different stations (STA) on different time-frequency resources. However, after the OFDMA technology is introduced to the next-generation WLAN system 802.11ax, a current problem is how to perform resource indication.

In the prior art, refer to a Long Term Evolution (LTE) system in which the OFDMA technology is used. In the LTE system, a resource is indicated in a manner of transmitting downlink control information (DCI) using a physical downlink control channel (PDCCH). The DCI carries resource indication information of all corresponding user equipments (UEs). After receiving the DCI, a UE searches the DCI space in a blind detection manner to obtain resource indication information of the UE.

However, in the LTE system resource indication manner, each UE needs to search the entire DCI for resource indication information of the UE in a blind detection manner. This has a high requirement for a processing capability of the UE. If the LTE system resource indication manner is directly used in a low-cost WLAN, costs and resource consumption of the WLAN may greatly increase.

SUMMARY

Embodiments of the present invention provide a WLAN system resource indication method and apparatus, so as to resolve a problem of large resource consumption in a resource indication manner in the prior art.

A first aspect of the present invention provides a WLAN system resource indication method, including:

generating, by an access point, a frame that carries resource indication information; and sending, by the access point to multiple stations, the frame that carries the resource indication information, where the resource indication information includes multiple pieces of sub resource indication information, correspondingly, each piece of the sub resource indication information uniquely corresponds to one of the multiple stations, and the sub resource indication information includes frequency domain resource allocation information and/or spatial flow information of a corresponding station; or sending, by the access point to multiple station groups, the frame that carries the resource indication information, where the resource indication information includes multiple pieces of sub resource indication information, correspondingly, each piece of the sub resource indication information uniquely corresponds to one of the multiple station groups, and the sub resource indication information includes frequency domain resource allocation information and/or spatial flow information of a corresponding station group.

With reference to the first aspect, in a first possible implementation manner of the first aspect, the frequency domain resource allocation information includes an index in a frequency domain resource allocation table, so that the station searches, according to the index in the frequency domain resource allocation table, the frequency domain resource allocation table for a size and a location of a frequency domain resource unit that uniquely corresponds to the station, or the station group searches, according to the index in the frequency domain resource allocation table, the frequency domain resource allocation table for a size and a location of a frequency domain resource unit that uniquely corresponds to the station group; and the frequency domain resource allocation table includes: frequency domain resource units with multiple different sizes, a quantity of frequency domain resource allocation manners that corresponds to frequency domain resource unit with each size, a location of each sub frequency domain resource that is in an entire frequency domain resource and that is obtained after division performed by using frequency domain resource unit with each size, and the index in the frequency domain resource allocation table.

With reference to the first possible implementation manner of the first aspect, in a second possible implementation manner of the first aspect, when a bandwidth of the WLAN system is 20 megahertz MHz, the sizes of the frequency domain resource units in the frequency domain resource allocation table include 26 tones, 52 tones, and 106 tones; or the sizes of the frequency domain resource units in the frequency domain resource allocation table include 26 tones, 52 tones, and 107 tones; or the sizes of the frequency domain resource units in the frequency domain resource allocation table include 26 tones, 52 tones, and 108 tones, where when the size of a frequency domain resource unit is 26 tones, nine resource allocation manners are included;

when the size of a frequency domain resource unit is 52 tones, four resource allocation manners are included; and when the size of a frequency domain resource unit is 106 tones, 107 tones, or 108 tones, two resource allocation manners are included.

With reference to the first possible implementation manner of the first aspect, in a third possible implementation manner of the first aspect, when a bandwidth of the WLAN system is 20 MHz, the sizes of the frequency domain resource units in the frequency domain resource allocation table include 26 tones, 52 tones, 106 tones, and 242 tones; or the sizes of the frequency domain resource units in the frequency domain resource allocation table include 26 tones, 52 tones, 107 tones, and 242 tones; or the sizes of the frequency domain resource units in the frequency domain resource allocation table include 26 tones, 52 tones, 108 tones, and 242 tones, where when the size of a frequency domain resource unit is 26 tones, nine resource allocation manners are included;

when the size of a frequency domain resource unit is 52 tones, four resource allocation manners are included;

when the size of a frequency domain resource unit is 106 tones, 107 tones, or 108 tones, two resource allocation manners are included; and when the size of a frequency domain resource unit is 242 tones, one resource allocation manner is included.

With reference to the first possible implementation manner of the first aspect, in a fourth possible implementation manner of the first aspect, when a bandwidth of the WLAN system is 40 MHz, the sizes of the frequency domain resource units in the frequency domain resource allocation table include 26 tones, 52 tones, 106 tones, and 242 tones; or the sizes of the frequency domain resource units in the frequency domain resource allocation table include 26 tones, 52 tones, 107 tones, and 242 tones; or the sizes of the frequency domain resource units in the frequency domain resource allocation table include 26 tones, 52 tones, 108 tones, and 242 tones, where when the size of a frequency domain resource unit is 26 tones, 18 resource allocation manners are included;

when the size of a frequency domain resource unit is 52 tones, eight resource allocation manners are included;

when the size of a frequency domain resource unit is 106 tones, 107 tones, or 108 tones, four resource allocation manners are included; and when the size of a frequency domain resource unit is 242 tones, two resource allocation manners are included.

With reference to the first possible implementation manner of the first aspect, in a fifth possible implementation manner of the first aspect, when a bandwidth of the WLAN system is 40 MHz, the sizes of the frequency domain resource units in the frequency domain resource allocation table include 26 tones, 52 tones, 106 tones, 242 tones, and 484 tones; or the sizes of the frequency domain resource units in the frequency domain resource allocation table include 26 tones, 52 tones, 107 tones, 242 tones, and 484 tones; or the sizes of the frequency domain resource units in the frequency domain resource allocation table include 26 tones, 52 tones, 108 tones, 242 tones, and 484 tones, where when the size of a frequency domain resource unit is 26 tones, 18 resource allocation manners are included;

when the size of a frequency domain resource unit is 52 tones, eight resource allocation manners are included;

when the size of a frequency domain resource unit is 106 tones, 107 tones, or 108 tones, four resource allocation manners are included;

when the size of a frequency domain resource unit is 242 tones, two resource allocation manners are included; and when the size of a frequency domain resource unit is 484 tones, one resource allocation manner is included.

With reference to the first possible implementation manner of the first aspect, in a sixth possible implementation manner of the first aspect, when a bandwidth of the WLAN system is 80 MHz, the sizes of the frequency domain resource units in the frequency domain resource allocation table include 26 tones, 52 tones, 106 tones, 242 tones, and 484 tones; or the sizes of the frequency domain resource units in the frequency domain resource allocation table include 26 tones, 52 tones, 107 tones, 242 tones, and 484 tones; or the sizes of the frequency domain resource units in the frequency domain resource allocation table include 26 tones, 52 tones, 108 tones, 242 tones, and 484 tones, where when the size of a frequency domain resource unit is 26 tones, 37 resource allocation manners are included;

when the size of a frequency domain resource unit is 52 tones, 16 resource allocation manners are included;

when the size of a frequency domain resource unit is 106 tones, 107 tones, or 108 tones, eight resource allocation manners are included;

when the size of a frequency domain resource unit is 242 tones, four resource allocation manners are included; and when the size of a frequency domain resource unit is 484 tones, two resource allocation manners are included.

With reference to the first possible implementation manner of the first aspect, in a seventh possible implementation manner of the first aspect, when a bandwidth of the WLAN system is 80 MHz, the sizes of the frequency domain resource units in the frequency domain resource allocation table include 26 tones, 52 tones, 106 tones, 242 tones, 484 tones, and 996 tones; or the sizes of the frequency domain resource units in the frequency domain resource allocation table include 26 tones, 52 tones, 107 tones, 242 tones, 484 tones, and 996 tones; or the sizes of the frequency domain resource units in the frequency domain resource allocation table include 26 tones, 52 tones, 108 tones, 242 tones, 484 tones, and 996 tones, where when the size of a frequency domain resource unit is 26 tones, 37 resource allocation manners are included;

when the size of a frequency domain resource unit is 52 tones, 16 resource allocation manners are included;

when the size of a frequency domain resource unit is 106 tones, 107 tones, or 108 tones, eight resource allocation manners are included;

when the size of a frequency domain resource unit is 242 tones, four resource allocation manners are included;

when the size of a frequency domain resource unit is 484 tones, two resource allocation manners are included; and when the size of a frequency domain resource unit is 996 tones, one resource allocation manner is included.

With reference to the first possible implementation manner of the first aspect, in an eighth possible implementation manner of the first aspect, when a bandwidth of the WLAN system is 80 MHz, the sizes of the frequency domain resource units in the frequency domain resource allocation table include 26 tones, 52 tones, 106 tones, 242 tones, and 484 tones; or the sizes of the frequency domain resource units in the frequency domain resource allocation table include 26 tones, 52 tones, 107 tones, 242 tones, and 484 tones; or the sizes of the frequency domain resource units in the frequency domain resource allocation table include 26 tones, 52 tones, 108 tones, 242 tones, and 484 tones, where when the size of a frequency domain resource unit is 26 tones, five resource allocation manners are included;

when the size of a frequency domain resource unit is 52 tones, 16 resource allocation manners are included;

when the size of a frequency domain resource unit is 106 tones, 107 tones, or 108 tones, eight resource allocation manners are included;

when the size of a frequency domain resource unit is 242 tones, four resource allocation manners are included; and when the size of a frequency domain resource unit is 484 tones, two resource allocation manners are included, where a frequency domain resource in which the size of a frequency domain resource unit is 26 tones is a remaining frequency domain resource obtained after division performed by using another frequency domain resource unit.

With reference to the first possible implementation manner of the first aspect, in a ninth possible implementation manner of the first aspect, when a bandwidth of the WLAN system is 80 MHz, the sizes of the frequency domain resource units in the frequency domain resource allocation table include 26 tones, 52 tones, 106 tones, 242 tones, 484 tones, and 996 tones; or the sizes of the frequency domain resource units in the frequency domain resource allocation table include 26 tones, 52 tones, 107 tones, 242 tones, 484 tones, and 996 tones; or the sizes of the frequency domain resource units in the frequency domain resource allocation table include 26 tones, 52 tones, 108 tones, 242 tones, 484 tones, and 996 tones, where when the size of a frequency domain resource unit is 26 tones, five resource allocation manners are included;

when the size of a frequency domain resource unit is 52 tones, 16 resource allocation manners are included;

when the size of a frequency domain resource unit is 106 tones, 107 tones, or 108 tones, eight resource allocation manners are included;

when the size of a frequency domain resource unit is 242 tones, four resource allocation manners are included;

when the size of a frequency domain resource unit is 484 tones, two resource allocation manners are included; and when the size of a frequency domain resource unit is 996 tones, one resource allocation manner is included, where a frequency domain resource in which the size of a frequency domain resource unit is 26 tones is a remaining frequency domain resource obtained after division performed by using another frequency domain resource unit.

With reference to the first aspect, in a tenth possible implementation manner of the first aspect, the spatial flow information includes an index in a spatial flow allocation table, so that the station searches, according to the index in the spatial flow allocation table, the spatial flow allocation table for a spatial flow allocation manner and a spatial flow sequence number that uniquely correspond to the station, where the spatial flow sequence number is a sequence number of an LTF, or a matrix row number corresponding to a spatial flow in a P matrix, or a sequence number of a spatial flow in MU-MIMO.

With reference to the tenth possible implementation manner of the first aspect, in an eleventh possible implementation manner of the first aspect, the spatial flow allocation table includes allocation manners of different quantities of spatial flows and corresponding indices.

With reference to the eleventh possible implementation manner of the first aspect, in a twelfth possible implementation manner of the first aspect, the allocation manners of different quantities of spatial flows and the corresponding indices include:

indices 0 to 7 respectively correspond to eight different allocation manners of a single flow;

indices 8 to 11 respectively correspond to four different allocation manners of two spatial flows, where the different allocation manners of two spatial flows include: an allocation manner of spatial flows whose spatial flow sequence numbers are first and second, an allocation manner of spatial flows whose spatial flow sequence numbers are third and fourth, an allocation manner of spatial flows whose spatial flow sequence numbers are fifth and sixth, and an allocation manner of spatial flows whose spatial flow sequence numbers are seventh and eighth;

indices 12 and 13 respectively correspond to two different allocation manners of three spatial flows, where the different allocation manners of the three spatial flows include: an allocation manner of spatial flows whose spatial flow sequence numbers are first, second, and third, and an allocation manner of spatial flows whose spatial flow sequence numbers are fourth, fifth, and sixth;

indices 14 and 15 respectively correspond to two different allocation manners of four spatial flows, where the different allocation manners of the four spatial flows include: an allocation manner of spatial flows whose spatial flow sequence numbers are first, second, third, and fourth, and an allocation manner of spatial flows whose spatial flow sequence numbers are fifth, sixth, seventh, and eighth;

an index 16 corresponds to one allocation manner of five spatial flows, where the allocation manner of five spatial flows includes: an allocation manner of spatial flows whose spatial flow sequence numbers are first, second, third, fourth, and fifth;

an index 17 corresponds to one allocation manner of six spatial flows, where the allocation manner of six spatial flows includes: an allocation manner of spatial flows whose spatial flow sequence numbers are first, second, third, fourth, fifth, and sixth;

an index 18 corresponds to one allocation manner of seven spatial flows, where the allocation manner of seven spatial flows includes: an allocation manner of spatial flows whose spatial flow sequence numbers are first, second, third, fourth, fifth, sixth, and seventh; and an index 19 corresponds to one allocation manner of eight spatial flows, where the allocation manner of eight spatial flows includes: an allocation manner of spatial flows whose spatial flow sequence numbers are first, second, third, fourth, fifth, sixth, seventh, and eighth.

With reference to the first aspect, in a thirteenth possible implementation manner of the first aspect, the spatial flow information includes a bitmap, and the bitmap is used to indicate a spatial flow allocation manner and a spatial flow sequence number that are allocated to a corresponding station, where the spatial flow sequence number is a sequence number of an LTF, or a matrix row number corresponding to a spatial flow in a P matrix, or a sequence number of a spatial flow in MU-MIMO.

With reference to the first aspect, in a fourteenth possible implementation manner of the first aspect, the sub resource indication information further includes: MCS information of a corresponding station, indication information about whether to use STBC, indication information about whether to use LDPC, and indication information about whether to use beamforming.

With reference to the first aspect, in a fifteenth possible implementation manner of the first aspect, the method further includes:

independently checking and coding, by the access point, each piece of the sub resource indication information in the resource indication information.

With reference to the first aspect, or the fourteenth or fifteenth possible implementation manner of the first aspect, in a sixteenth possible implementation manner of the first aspect, the sub resource indication information further includes an identifier of a corresponding station.

With reference to the sixteenth possible implementation manner of the first aspect, in a seventeenth possible implementation manner of the first aspect, the identifier of the corresponding station is an AID of the corresponding station or a PAID of the station.

With reference to the first aspect, in an eighteenth possible implementation manner of the first aspect, the sending, by the access point to multiple stations, the frame that carries the resource indication information includes:

sending, by the access point to the multiple stations, a PPDU that carries the resource indication information; or the sending, by the access point to multiple station groups, the frame that carries the resource indication information includes:

sending, by the access point to the multiple station groups, a PPDU that carries the resource indication information, where the resource indication information is carried in a HE-SIGB part of a PLCP header field in the PPDU, or a MAC part of the PPDU, and the PPDU is a trigger frame, or a data frame that transmits uplink/downlink data.

With reference to the eighteenth possible implementation manner of the first aspect, in a nineteenth possible implementation manner of the first aspect, a common part of the HE-SIGB part in the PPDU further includes an group identifier of an orthogonal frequency division multiple access OFDMA station used to indicate the multiple stations.

With reference to the nineteenth possible implementation manner of the first aspect, in a twentieth possible implementation manner of the first aspect, before the access point sends the PPDU to the multiple stations, the method further includes:

sending, by the access point, a management frame to the multiple stations, where the management frame is used to indicate the OFDMA station group identifier of the multiple stations to which a corresponding station belongs, and location information of each station in the multiple stations.

A second aspect of the embodiments of the present invention provides a WLAN system resource indication method, including:

receiving, by a station, a frame that is sent by an access point and that carries resource indication information, where the resource indication information includes multiple pieces of sub resource indication information; and successively reading, by the station, pieces of the sub resource indication information in a preset sequence, and stopping reading the sub resource indication information after the sub resource indication information corresponding to the station is obtained by means of reading, where the sub resource indication information includes frequency domain resource allocation information and/or spatial flow information of a corresponding station.

A third aspect of the embodiments of the present invention provides a WLAN system resource indication apparatus, including:

a generation module configured to generate a frame that carries resource indication information; and a sending module configured to send, to multiple stations, the frame that carries the resource indication information, where the resource indication information includes multiple pieces of sub resource indication information, correspondingly, each piece of the sub resource indication information uniquely corresponds to one of the multiple stations, and the sub resource indication information includes frequency domain resource allocation information and/or spatial flow information of a corresponding station; or send, to multiple station groups, the frame that carries the resource indication information, where the resource indication information includes multiple pieces of sub resource indication information, correspondingly, each piece of the sub resource indication information uniquely corresponds to one of the multiple station groups, and the sub resource indication information includes frequency domain resource allocation information and/or spatial flow information of a corresponding station group.

A fourth aspect of the embodiments of the present invention provides a WLAN system resource indication apparatus, including:

a receiving module configured to receive a frame that is sent by an access point and that carries resource indication information, where the resource indication information includes multiple pieces of sub resource indication information; and a reading module configured to successively read pieces of the sub resource indication information in a preset sequence, and stop reading the sub resource indication information after sub resource indication information corresponding to the station is obtained by means of reading, where the sub resource indication information includes frequency domain resource allocation information and/or spatial flow information of a corresponding station.

According to the WLAN system resource indication method and apparatus provided in the embodiments of the present invention, resource indication information sent by an access point to multiple stations or multiple station groups includes multiple pieces of sub resource indication information, and each piece of the sub resource indication information uniquely corresponds to one station or one station group. In this way, after receiving the resource indication information, the station or the station group needs to read only sub resource indication information, and may stop reading when the sub resource indication information of the station or the station group is obtained, with no need to read the entire resource indication information. This greatly reduces resource overheads and may also improve efficiency.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are some but not all of the embodiments, and other embodiments obtained by persons of ordinary skill in the art based on the embodiments of the present disclosure without creative effort shall fall within the protection scope of the present disclosure.

The embodiments herein are applicable to a WLAN. Currently, a standard used in the WLAN is the Institute of Electrical and Electronics Engineers (IEEE) 802.11 series. The WLAN may include multiple basic service sets (BSSs). A network node in a basic service set is a STA. Stations include an access point-type station (AP) and a non-access point-type station (Non-AP STA). Each basic service set may include one AP and multiple non-AP STAs associated with the AP.

The access point-type station is also referred to as a wireless access point, a hotspot, or the like. The AP is an access point used by a mobile user to access a wired network, and is mainly deployed in a home, inside a building, or inside a campus. A typical coverage diameter ranges from tens of meters to hundreds of meters. Certainly, the AP may also be deployed outdoors. The AP is equivalent to a bridge that connects a wired network and a wireless network. A main function of the AP is to connect wireless network clients and then connect the wireless network to an Ethernet. The AP may be a terminal device or network device that includes a Wireless Fidelity (WiFi) chip. Optionally, the AP may be a device that supports the 802.11ax standard. In another option, the AP may be a device that supports multiple WLAN standards such as 802.11ac, 802.11n, 802.11g, 802.11b, and 802.11a.

The foregoing non-AP STA may be a wireless communications chip, a wireless sensor, or a wireless communications terminal, for example, a mobile phone that supports a WiFi communications function, a tablet computer that supports a WiFi communications function, a set top box that supports a WiFi communications function, a smart television that supports a WiFi communications function, a smart wearable device that supports a WiFi communications function, a vehicle-mounted communications device that supports a WiFi communications function, or a computer that supports a WiFi communications function. Optionally, the station may support the 802.11ax standard. Further, optionally, the station supports multiple WLAN standards such as 802.11ac, 802.11n, 802.11g, 802.11b, and 802.11a.

Figure 1:
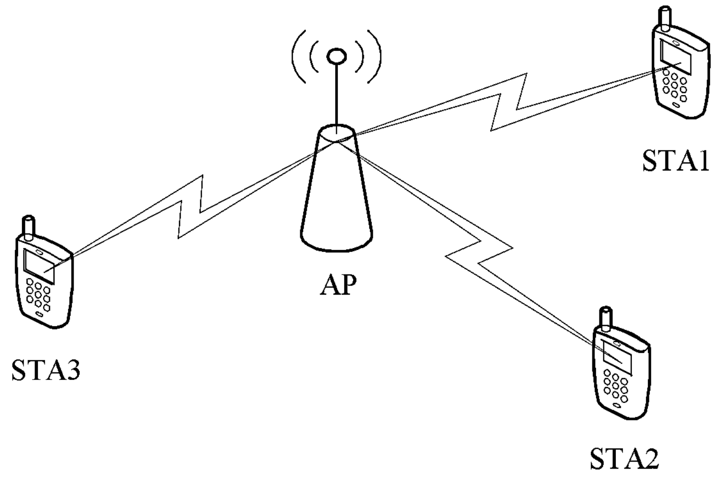
FIG. 1 is a structural diagram of Embodiment 1 of a WLAN system according to an embodiment.

FIG. 1 is a structural diagram of Embodiment 1 of a WLAN system according to an embodiment. As shown in FIG. 1, one AP in the WLAN system may exchange information with multiple STAs (using three STAs as an example), which include STA1, STA2, and STA3. Certainly, the present disclosure is not limited thereto. One AP may also exchange information with multiple STA groups.

In a WLAN system 802.11ax to which an OFDMA technology is introduced, an AP may perform uplink and downlink transmission for different STAs on different time-frequency resources. The AP may perform uplink and downlink transmission by using different modes, for example, an OFDMA Single User Multiple-Input Multiple-Output (SU-MIMO) mode or OFDMA Multi User Multiple-Input Multiple-Output (MU-MIMO) mode.

The AP may simultaneously send a downlink physical layer protocol data unit (, PPDU) to multiple stations or multiple station groups. The multiple stations herein may refer to stations in the SU-MIMO mode, and the multiple station groups herein may refer to station groups in the MU-MIMO mode.

Specifically, the PPDU sent by the AP includes a Physical Layer Convergence Protocol (PLCP) header field and a data field. The PLCP header includes a preamble (L-Preamble) and a control field. The control field includes a high efficiency signaling A (HE-SIGA) part and a high efficiency signaling B (HE-SIGB) part. The PPDU may further include a Media Access Control (MAC) part.

Figure 2:
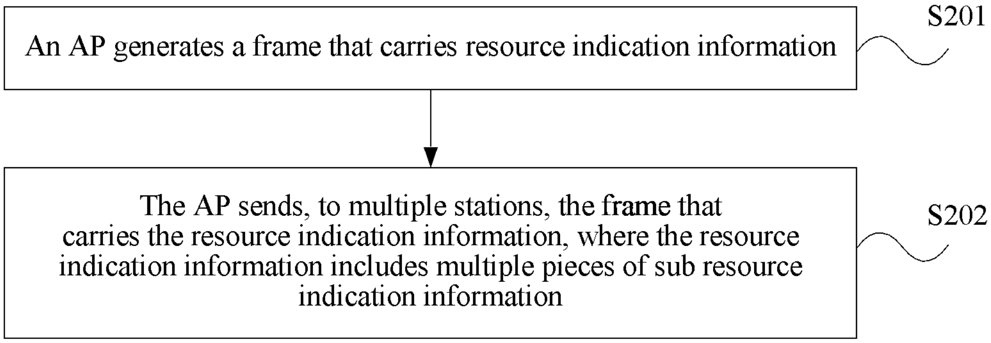
FIG. 2 is a flowchart of Embodiment 1 of a WLAN system resource indication method according to an embodiment.

FIG. 2 is a flowchart of Embodiment 1 of a WLAN system resource indication method according to an embodiment. As shown in FIG. 2, the method includes the following steps.

S201: An AP generates a frame that carries resource indication information.

Referring to FIG. 1, the AP corresponds to multiple stations or corresponds to multiple station groups. In different structures, objects to which the AP sends the frame that carries the resource indication information are different when the AP corresponds to multiple stations.

S202: The AP sends, to multiple stations, the frame that carries the resource indication information. The resource indication information includes multiple pieces of sub resource indication information. Each piece of the sub resource indication information uniquely corresponds to one of the multiple stations.

The sub resource indication information includes frequency domain resource allocation information and/or spatial flow information of a corresponding station.

That is, each piece of the sub resource indication information includes only frequency domain resource indication information of the uniquely corresponding station.

In a structure in which the AP corresponds to multiple station groups, the foregoing S202 may be replaced by the following: the AP sends, to multiple station groups, the frame that carries the resource indication information. The resource indication information includes multiple pieces of sub resource indication information. Each piece of the sub resource indication information uniquely corresponds to one of the multiple station groups. The sub resource indication information includes frequency domain resource allocation information and/or spatial flow information of a corresponding station group. That is, each piece of the sub resource indication information includes only frequency domain resource indication information of the uniquely corresponding station group.

In this embodiment, resource indication information sent by an access point to multiple stations or multiple station groups includes multiple pieces of sub resource indication information. Each piece of the sub resource indication information uniquely corresponds to one station or one station group. In this way, after receiving the resource indication information, the station or the station group needs to read only sub resource indication information, and may stop reading when the sub resource indication information of the station or the station group is obtained, with no need to read the entire resource indication information. This greatly reduces resource overheads and may also improve efficiency.

Based on the foregoing embodiment, the frequency domain resource allocation information in the foregoing sub resource indication information includes an index in a frequency domain resource allocation table. After obtaining the sub resource indication information of the station, the station may search, according to the index in the frequency domain resource allocation table, the frequency domain resource allocation table for a size and a location of a frequency domain resource unit that uniquely corresponds to the station. Similarly, after obtaining the sub resource indication information of the corresponding station group, the station group may search, according to the index in the frequency domain resource allocation table, the frequency domain resource allocation table for a size and a location of a frequency domain resource unit that uniquely corresponds to the station group.

Specifically, the frequency domain resource allocation table may include: frequency domain resource units with multiple different sizes, a quantity of resource allocation manners that corresponds to frequency domain resource unit with each size, a location of each sub frequency domain resource that is in an entire frequency domain resource and that is obtained after division performed by using frequency domain resource unit with each size, and the index in the frequency domain resource allocation table. A sub frequency domain resource obtained after the division is denoted as a resource unit (Resource Unit, RU for short). In a specific implementation process, the frequency domain resource allocation table may be preset in each station.

It should be noted that, when the sub frequency domain resources obtained after the division performed by using the different sizes of frequency domain resource units are numbered, indices are not reused.

Further, frequency domain resource allocation tables vary according to different bandwidths of a WLAN system. The bandwidths of the WLAN system include 20 MHz, 40 MHz, 80 MHz, and (80+80) MHz. Currently, a 256-point fast Fourier transformation (FFT) processing manner is used in a 20 MHz bandwidth, and correspondingly, the 20 MHz bandwidth includes 256 tones.

When a bandwidth of the WLAN system is 20 megahertz (MHz), the frequency domain resource allocation table is shown in Table 1.

TABLE 1

| Index | Resource allocation information (20 MHz bandwidth) |
|---|---|
| 0-8 | Each RU includes 26 tones, and nine resource allocation manners are included. |
| 9-12 | Each RU includes 52 tones, and four resource allocation manners are included. |
| 13-14 | Each RU includes 106/107/108 tones, and two resource allocation manners are included. |
| 15 | Reserved |

It can be seen that the sizes of the frequency domain resource units in the frequency domain resource allocation table may include: 26 tones, 52 tones, and 106 tones; or 26 tones, 52 tones, and 107 tones; or 26 tones, 52 tones, and 108 tones.

When the size of a frequency domain resource unit is 26 tones, nine resource allocation manners are included. When the size of a frequency domain resource unit is 52 tones, four resource allocation manners are included. When the size of a frequency domain resource unit is 106 tones, 107 tones, or 108 tones, two resource allocation manners are included.

That is, when the bandwidth of the WLAN system is 20 MHz, and the size of a frequency domain resource unit is 26 tones, a total of nine units (RU) may be obtained after the division. Therefore, there are nine resource allocation possibilities. Other cases are not enumerated.

When a bandwidth of the WLAN system is 20 MHz, the frequency domain resource allocation table may be further shown in Table 2.

TABLE 2

| Index | Resource allocation information (20 MHz bandwidth) |
|---|---|
| 0-8 | Each RU includes 26 tones, and nine resource allocation manners are included. |
| 9-12 | Each RU includes 52 tones, and four resource allocation manners are included. |
| 13-14 | Each RU includes 106/107/108 tones, and two resource allocation manners are included. |
| 15 | Each RU includes 242 tones, and one resource allocation manner is included. |

In comparison with the allocation manners in Table 1, a frequency domain resource unit of 242 tones is added.

That is, the sizes of the frequency domain resource units in the frequency domain resource allocation table include 26 tones, 52 tones, 106 tones, and 242 tones; or 26 tones, 52 tones, 107 tones, and 242 tones; or 26 tones, 52 tones, 108 tones, and 242 tones.

When the size of a frequency domain resource unit is 26 tones, nine resource allocation manners are included. When the size of a frequency domain resource unit is 52 tones, four resource allocation manners are included. When the size of a frequency domain resource unit is 106 tones, 107 tones, or 108 tones, two resource allocation manners are included. When the size of a frequency domain resource unit is 242 tones, one resource allocation manner is included.

When the bandwidth of the WLAN system is 20 MHz, 4 bits (bit) may be used to represent an index in the frequency domain resource allocation table. For example, “0000” represents index 0, and “0001” represents index 1.

When a bandwidth of the WLAN system is 40 MHz, the frequency domain resource allocation table may be shown in Table 3.

TABLE 3

| Index | Resource allocation information (40 MHz bandwidth) |
|---|---|
| 0-17 | Each RU includes 26 tones, and 18 resource allocation manners are included. |
| 18-25 | Each RU includes 52 tones, and eight resource allocation manners are included. |
| 26-29 | Each RU includes 106/107/108 tones, and four resource allocation manners are included. |
| 30-31 | Each RU includes 242 tones, and two resource allocation manners are included. |

That is, the sizes of the frequency domain resource units in the frequency domain resource allocation table include 26 tones, 52 tones, 106 tones, and 242 tones; or 26 tones, 52 tones, 107 tones, and 242 tones; or 26 tones, 52 tones, 108 tones, and 242 tones.

When the size of a frequency domain resource unit is 26 tones, 18 resource allocation manners are included. When the size of a frequency domain resource unit is 52 tones, eight resource allocation manners are included. When the size of a frequency domain resource unit is 106 tones, 107 tones, or 108 tones, four resource allocation manners are included. When the size of a frequency domain resource unit is 242 tones, two resource allocation manners are included.

In this case, 5 bits may be used to represent an index in the frequency domain resource allocation table. For example, “00000” represents index 0, and “00001” represents index 1.

When a bandwidth of the WLAN system is 40 MHz, the frequency domain resource allocation table may be further shown in Table 4.

TABLE 4

| Index | Resource allocation information (40 MHz bandwidth) |
|---|---|
| 0-17 | Each RU includes 26 tones, and 18 resource allocation manners are included. |
| 18-25 | Each RU includes 52 tones, and eight resource allocation manners are included. |
| 26-29 | Each RU includes 106/107/108 tones, and four resource allocation manners are included. |
| 30-31 | Each RU includes 242 tones, and two resource allocation manners are included. |
| 32 | Each RU includes 484 tones, and one resource allocation manner is included. |
| 33-63 | Reserved |

That is, the sizes of the frequency domain resource units in the frequency domain resource allocation table include 26 tones, 52 tones, 106 tones, 242 tones, and 484 tones; or 26 tones, 52 tones, 107 tones, 242 tones, and 484 tones; or 26 tones, 52 tones, 108 tones, 242 tones, and 484 tones.

Correspondingly, when the size of a frequency domain resource unit is 26 tones, 18 resource allocation manners are included. When the size of a frequency domain resource unit is 52 tones, eight resource allocation manners are included. When the size of a frequency domain resource unit is 106 tones, 107 tones, or 108 tones, four resource allocation manners are included. When the size of a frequency domain resource unit is 242 tones, two resource allocation manners are included. When the size of a frequency domain resource unit is 484 tones, one resource allocation manner is included.

In this case, 6 bits may be used to represent an index in the frequency domain resource allocation table.

When a bandwidth of the WLAN system is 80 MHz, the frequency domain resource allocation table may be shown in Table 5.

TABLE 5

| Index | Resource allocation information (80 MHz bandwidth) |
|---|---|
| 0-36 | Each RU includes 26 tones, and 37 resource allocation manners are included. |
| 37-52 | Each RU includes 52 tones, and 16 resource allocation manners are included. |
| 53-60 | Each RU includes 106/107/108 tones, and eight resource allocation manners are included. |
| 61-64 | Each RU includes 242 tones, and four resource allocation manners are included. |
| 65-66 | Each RU includes 484 tones, and two resource allocation manners are included. |
| 67-127 | Reserved |

That is, the sizes of the frequency domain resource units in the frequency domain resource allocation table include 26 tones, 52 tones, 106 tones, 242 tones, and 484 tones; or 26 tones, 52 tones, 107 tones, 242 tones, and 484 tones; or 26 tones, 52 tones, 108 tones, 242 tones, and 484 tones.

Correspondingly, when the size of a frequency domain resource unit is 26 tones, 37 resource allocation manners are included. When the size of a frequency domain resource unit is 52 tones, 16 resource allocation manners are included. When the size of a frequency domain resource unit is 106 tones, 107 tones, or 108 tones, eight resource allocation manners are included. When the size of a frequency domain resource unit is 242 tones, four resource allocation manners are included. When the size of a frequency domain resource unit is 484 tones, two resource allocation manners are included.

In this case, 7 bits may be used to represent an index in the frequency domain resource allocation table.

Figure 3:
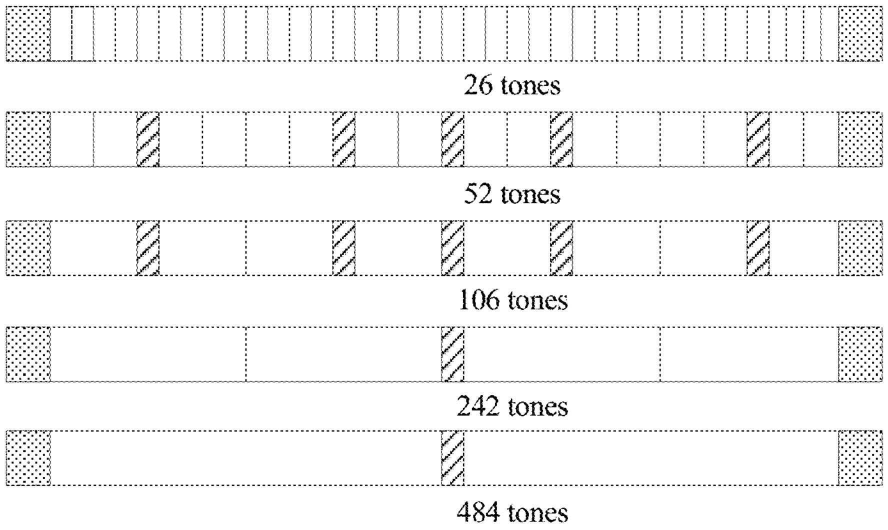
FIG. 3 is a diagram of frequency domain resource division in a WLAN system resource indication method according to an embodiment.

Referring to FIG. 3, for example, a bandwidth of the WLAN system is 80 MHz. In FIG. 3, five division manners are included. Each row represents one division manner. A first row represents division performed by using a frequency domain resource unit of 26 tones. Each white grid represents one RU including 26 tones, and there are a total of 37 white grids. A second row represents division performed by using a frequency domain resource unit of 52 tones. Each white grid represents one RU including 52 tones, and there are a total of 16 white grids. A shaded grid indicates that a remaining resource is divided by using a frequency domain resource unit of 26 tones, and five RUs including 26 tones are included. A third row represents division performed by using a frequency domain resource unit of 106 (or 107, or 108) tones. Each white grid represents one RU including 106 (or 107, or 108) tones, and there are a total of eight white grids. A shaded grid indicates that a remaining resource is divided by using a frequency domain resource unit of 26 tones, and five RUs including 26 tones are included. A fourth row represents division performed by using a frequency domain resource unit of 242 tones. Each white grid represents one RU including 242 tones, and there are a total of four white grids. A shaded grid indicates that a remaining resource is divided by using a frequency domain resource unit of 26 tones, and one RU including 26 tones is included. A fifth row represents division performed by using a frequency domain resource unit of 484 tones. Each white grid represents one RU including 484 tones, and there are a total of two white grids. A shaded grid indicates that a remaining resource is divided by using a frequency domain resource unit of 26 tones, and one RU including 26 tones is included.

In the frequency domain resource allocation table, a frequency domain resource location corresponding to each index is fixed and unique. Table 5 and FIG. 3 are used as examples, and sequence number 0 in Table 5 identifies the first white grid in the first row in FIG. 3, that is, the first RU of 26 tones.

When a bandwidth of the WLAN system is 80 MHz, the frequency domain resource allocation table may be further shown in Table 6.

TABLE 6

| Index | Resource allocation information (80 MHz bandwidth) |
|---|---|
| 0-36 | Each RU includes 26 tones, and 37 resource allocation manners are included. |
| 37-52 | Each RU includes 52 tones, and 16 resource allocation manners are included. |
| 53-60 | Each RU includes 106/107/108 tones, and eight resource allocation manners are included. |
| 61-64 | Each RU includes 242 tones, and four resource allocation manners are included. |
| 65-66 | Each RU includes 484 tones, and two resource allocation manners are included. |
| 67 | Each RU includes 996 tones, and one resource allocation manner is included. |
| 68-127 | Reserved |

That is, the sizes of the frequency domain resource units in the frequency domain resource allocation table include 26 tones, 52 tones, 106 tones, 242 tones, 484 tones, and 996 tones; or 26 tones, 52 tones, 107 tones, 242 tones, 484 tones, and 996 tones; or 26 tones, 52 tones, 108 tones, 242 tones, 484 tones, and 996 tones.

When the size of a frequency domain resource unit is 26 tones, 37 resource allocation manners are included. When the size of a frequency domain resource unit is 52 tones, 16 resource allocation manners are included. When the size of a frequency domain resource unit is 106 tones, 107 tones, or 108 tones, eight resource allocation manners are included. When the size of a frequency domain resource unit is 242 tones, four resource allocation manners are included. When the size of a frequency domain resource unit is 484 tones, two resource allocation manners are included. When the size of a frequency domain resource unit is 996 tones, one resource allocation manner is included.

In this case, 7 bits may be used to represent an index in the frequency domain resource allocation table.

Figure 4A:
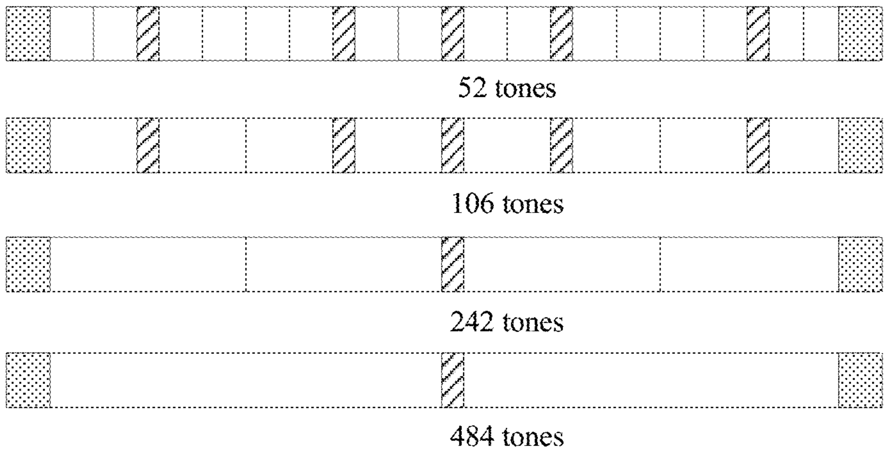
FIG. 4*a* is another diagram of frequency domain resource division in a WLAN system resource indication method according to an embodiment.

Based on the foregoing embodiment, when the bandwidth of the WLAN system is 80 MHz, to further reduce overheads for transmitting the resource indication information, 26 tones may not be independently used as a frequency domain resource unit for resource division. Referring to FIG. 4*a*, based on FIG. 3, the original division manner of the first row in FIG. 3 does not exist in FIG. 4*a*, and other division manners in which a remaining resource is divided by using a frequency domain resource unit of 26 tones are reserved.

Correspondingly, when a bandwidth of the WLAN system is 80 MHz, the frequency domain resource allocation table may be further shown in Table 7.

TABLE 7

| Index | Resource allocation information (80 MHz bandwidth) |
|---|---|
| 0-4 | Each RU includes 26 tones, and five resource allocation manners are included. |
| 5-20 | Each RU includes 52 tones, and 16 resource allocation manners are included. |
| 21-28 | Each RU includes 106/107/108 tones, and eight resource allocation manners are included. |
| 29-32 | Each RU includes 242 tones, and four resource allocation manners are included. |
| 33-34 | Each RU includes 484 tones, and two resource allocation manners are included. |
| 35-63 | Reserved |

That is, the sizes of the frequency domain resource units in the frequency domain resource allocation table include 26 tones, 52 tones, 106 tones, 242 tones, and 484 tones; or 26 tones, 52 tones, 107 tones, 242 tones, and 484 tones; or 26 tones, 52 tones, 108 tones, 242 tones, and 484 tones.

When the size of a frequency domain resource unit is 26 tones, five resource allocation manners are included. It should be noted that, in this case, a frequency domain resource in which the size of a frequency domain resource unit is 26 tones is a remaining frequency domain resource obtained after division performed by using another frequency domain resource unit. As shown in FIG. 4*a*, in the four division manners in FIG. 4*a*, a shaded part is a result obtained by dividing a remaining resource by using a frequency domain resource unit of 26 tones. In the four division manners, at most five RUs including 26 tones are included. Referring to FIG. 4*a* generally, these remaining resources are sandwiched between other frequency domain resources, but the present invention is not limited thereto.

When the size of a frequency domain resource unit is 52 tones, 16 resource allocation manners are included. When the size of a frequency domain resource unit is 106 tones, 107 tones, or 108 tones, eight resource allocation manners are included. When the size of a frequency domain resource unit is 242 tones, four resource allocation manners are included. When the size of a frequency domain resource unit is 484 tones, two resource allocation manners are included.

In this case, 6 bits may be used to represent an index in the frequency domain resource allocation table. This saves more overheads in comparison with the foregoing 80 MHz bandwidth resource allocation manner in which 7 bits are used.

Similar to Table 7, when a bandwidth of the WLAN system is 80 MHz, a frequency domain resource allocation table may be further shown in Table 8.

TABLE 8

| Index | Resource allocation information (80 MHz bandwidth) |
|---|---|
| 0-4 | Each RU includes 26 tones, and five resource allocation manners are included. |
| 5-20 | Each RU includes 52 tones, and 16 resource allocation manners are included. |
| 21-28 | Each RU includes 106/107/108 tones, and eight resource allocation manners are included. |
| 29-32 | Each RU includes 242 tones, and four resource allocation manners are included. |
| 33-34 | Each RU includes 484 tones, and two resource allocation manners are included. |
| 35 | Each RU includes 996 tones, and one resource allocation manner is included. |
| 36-63 | Reserved |

The sizes of the frequency domain resource units in the frequency domain resource allocation table include 26 tones, 52 tones, 106 tones, 242 tones, 484 tones, and 996 tones; or 26 tones, 52 tones, 107 tones, 242 tones, 484 tones, and 996 tones; or 26 tones, 52 tones, 108 tones, 242 tones, 484 tones, and 996 tones.

When the size of a frequency domain resource unit is 26 tones, five resource allocation manners are included. It should be noted that, in this case, a frequency domain resource in which the size of a frequency domain resource unit is 26 tones is a remaining frequency domain resource obtained after division performed by using another frequency domain resource unit. As shown in FIG. 4*a*, in the four division manners in FIG. 4*a*, a shaded part is a result obtained by dividing a remaining resource by using a frequency domain resource unit of 26 tones. In the four division manners, at most five RUs including 26 tones are included. Referring to FIG. 4*a* generally, these remaining resources are sandwiched between other frequency domain resources, but the present invention is not limited thereto.

When the size of a frequency domain resource unit is 52 tones, 16 resource allocation manners are included. When the size of a frequency domain resource unit is 106 tones, 107 tones, or 108 tones, eight resource allocation manners are included. When the size of a frequency domain resource unit is 242 tones, four resource allocation manners are included. When the size of a frequency domain resource unit is 484 tones, two resource allocation manners are included. When the size of a frequency domain resource unit is 996 tones, one resource allocation manner is included.

In these foregoing frequency domain resource allocation tables, a frequency domain resource location corresponding to each index is fixed and unique. Table 7 and FIG. 4*a* are used as examples, and sequence number 5 in Table 7 identifies the first white grid in the first row in FIG. 4*a*, that is, the first RU of 52 tones.

It should be noted that the present invention further includes another embodiment. A same frequency domain resource allocation index table is used in different bandwidths of the WLAN system. The bandwidths of the WLAN system include 20 MHz, 40 MHz, 80 MHz, and 160 MHz or (80+80) MHz. Currently, a 256-point fast Fourier transformation (FFT) processing manner is used in a 20 MHz bandwidth, and correspondingly, the 20 MHz bandwidth includes 256 tones.

In this embodiment, a frequency domain resource allocation index table uses an 80 MHz bandwidth as a criterion, and the 80 MHz bandwidth includes 1024 tones. In FIG. 3, five frequency domain resource allocation manners for the 80 MHz bandwidth are included. Each row represents one allocation manner.

The first row represents division performed by using a frequency domain resource unit of 26 tones. Each white grid represents one RU including 26 tones, and there are a total of 37 white grids.

The second row represents division performed by using a frequency domain resource unit of 52 tones. Each white grid represents one RU including 52 tones, and there are a total of 16 white grids. A shaded grid indicates that a remaining resource is divided by using a frequency domain resource unit of 26 tones, and five RUs including 26 tones are included.

The third row represents division performed by using a frequency domain resource unit of 106 (or 107, or 108) tones. Each white grid represents one RU including 106 (or 107, or 108) tones, and there are a total of eight white grids. A shaded grid indicates that a remaining resource is divided by using a frequency domain resource unit of 26 tones, and five RUs including 26 tones are included.

The fourth row represents division performed by using a frequency domain resource unit of 242 tones. Each white grid represents one RU including 242 tones, and there are a total of four white grids. A shaded grid represents that a remaining resource is divided by using a frequency domain resource unit of 26 tones, and one RU including 26 tones is included.

The fifth row represents division performed by using a frequency domain resource unit of 484 tones. Each white grid represents one RU including 484 tones, and there are a total of two white grids. A shaded grid indicates that a remaining resource is divided by using a frequency domain resource unit of 26 tones, and one RU including 26 tones is included.

One frequency domain resource unit may be allocated to each user. The frequency domain resource unit may be a 26-tone RU, a 52-tone RU, a 106 (or 107, or 108)-tone RU, a 242-tone RU, or a 484-tone RU. It can be learned from FIG. 3 that, if frequency domain tones on the 80 MHz bandwidth use the 26-tone RU as a frequency domain resource unit, 36 options are included, and there are a total of 36 26-tone RUs on four 20 MHz bandwidths; or 37 options are included, and there are a total of 36 26-tone RUs on four 20 MHz bandwidths and one middle 26-tone RU.

If frequency domain tones on the 80 MHz bandwidth use the 52-tone RU as a frequency domain resource unit, 16 options are included. If frequency domain tones on the 80 MHz bandwidth use the 106 (or 107, or 108)-tone RU as a frequency domain resource unit, eight options are included. If frequency domain tones on the 80 MHz bandwidth use the 242-tone RU as a frequency domain resource unit, four options are included. If frequency domain tones on the 80 MHz bandwidth use the 484-tone RU as a frequency domain resource unit, two options are included. Therefore, for the frequency domain tones on the 80 MHz bandwidth, 66 or 67 options are included, and an index with at least 7 bits is needed to identify a frequency domain resource allocation manner for each user.

Optionally, all frequency domain resource allocation manners of the WLAN system are identified by using indices with 8 bits, and the indices with 8 bits are applicable to 20 MHz, 40 MHz, 80 MHz, and 160 MHz bandwidths. A maximum bandwidth used in the WLAN system is 160 MHz. At least two implementation manners are included.

Figure 4B:
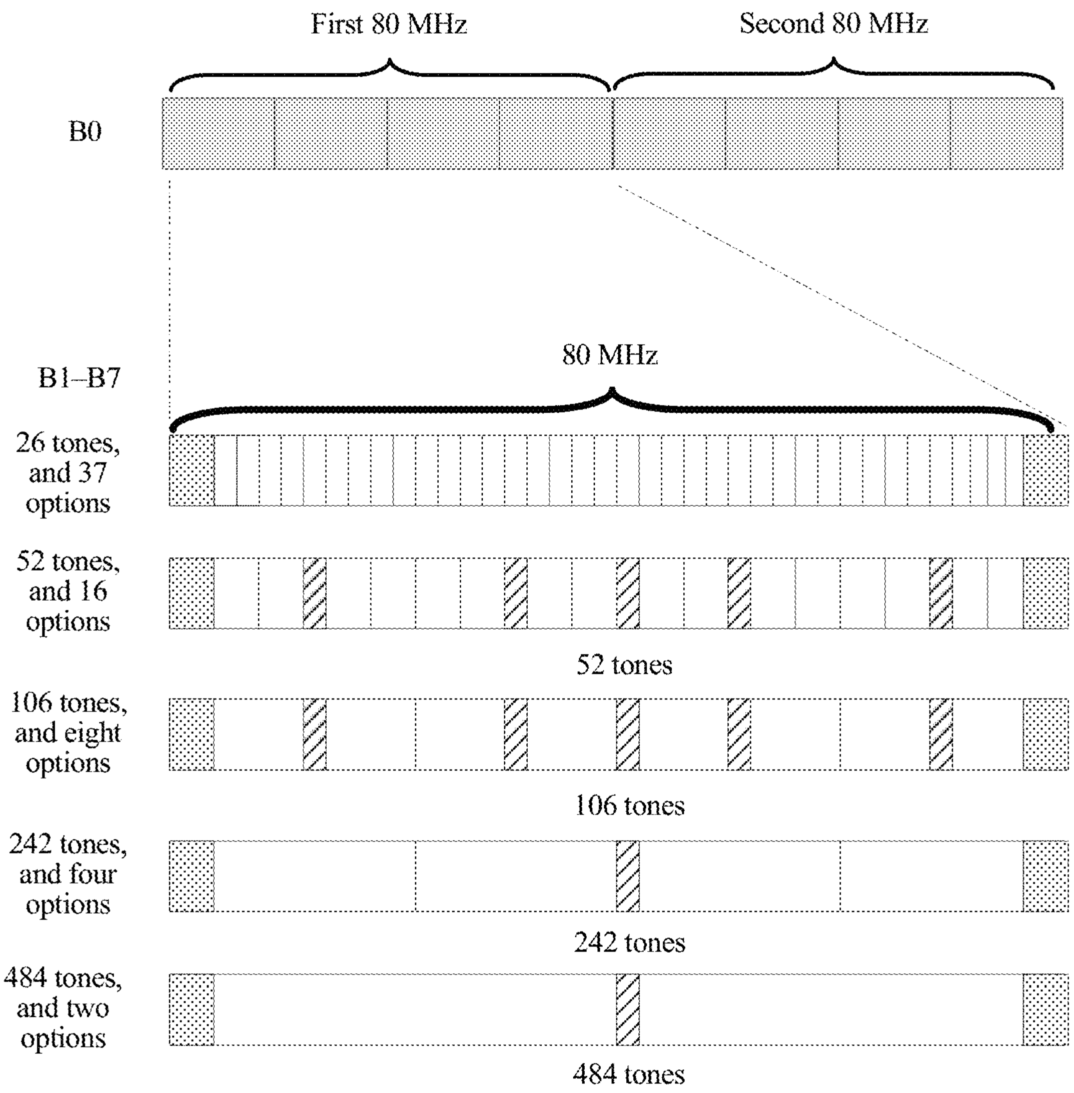
FIG. 4*b* is another diagram of frequency domain resource allocation information in a WLAN system resource indication method according to an embodiment.

An implementation manner 1 is shown in FIG. 4*b*.

A specific bit (for example, the first bit (B0)) of an index is used to differentiate between two 80 MHz bandwidths; and "0" indicates a first 80 MHz bandwidth, and "1" indicates a second 80 MHz bandwidth.

Remaining 7 bits (for example, (B1-B7)) of the index indicates a specific frequency domain resource allocation manner. The remaining 7 bits of the index may represent a maximum of 128 options. Therefore, the remaining 7 bits of the index are further reserved for multiple options. For example, all tones on an 80 MHz bandwidth are allocated to a user, or all tones on a 160 MHz or (80+80) MHz bandwidth are allocated to a user.

It should be noted that there may be multiple correspondences between the remaining 7 bits of the index and a frequency domain resource allocation manner for each user. No specific limitation is imposed herein. Table 8a and Table 8b show two correspondences.

TABLE 8a

| 7-bit index | Message (a frequency domain resource allocation manner for each user) | Number of entries (a quantity of frequency domain resource allocation manners) |
|---|---|---|
| 0000000-0100011 | 26-tone RU (resource unit) | 36 |
| 0100100-0110011 | 52-tone RU (resource unit) | 16 |
| 0110100-0111011 | 106-tone RU (resource unit) | 8 |
| 0111100-0111111 | 242-tone RU (resource unit) | 4 |
| 1000000-1000001 | 484-tone RU (resource unit) | 2 |
| Others | Reserved | |

TABLE 8b

| 7-bit index | Message (a frequency domain resource allocation manner for each user) | Number of entries (a quantity of frequency domain resource allocation manners) |
|---|---|---|
| 0000000-0100100 | 26-tone RU (resource unit) | 37 |
| 0100101-0110100 | 52-tone RU (resource unit) | 16 |
| 0110101-0111100 | 106-tone RU (resource unit) | 8 |
| 0111101-1000000 | 242-tone RU (resource unit) | 4 |
| 1000001-1000010 | 484-tone RU (resource unit) | 2 |
| Others | Reserved | |

In the implementation manner 1, an index with 8 bits is used to indicate frequency domain resource allocation. The first bit is used to indicate an occupied location in an 80 MHz bandwidth, and the remaining 7 bits are used to indicate a specific frequency domain resource allocation manner. In the foregoing manner, frequency domain resource allocation of the WLAN system of different bandwidths uses a same frequency resource indexing manner, so as to reduce processing complexity of the WLAN system.

Figure 4C:
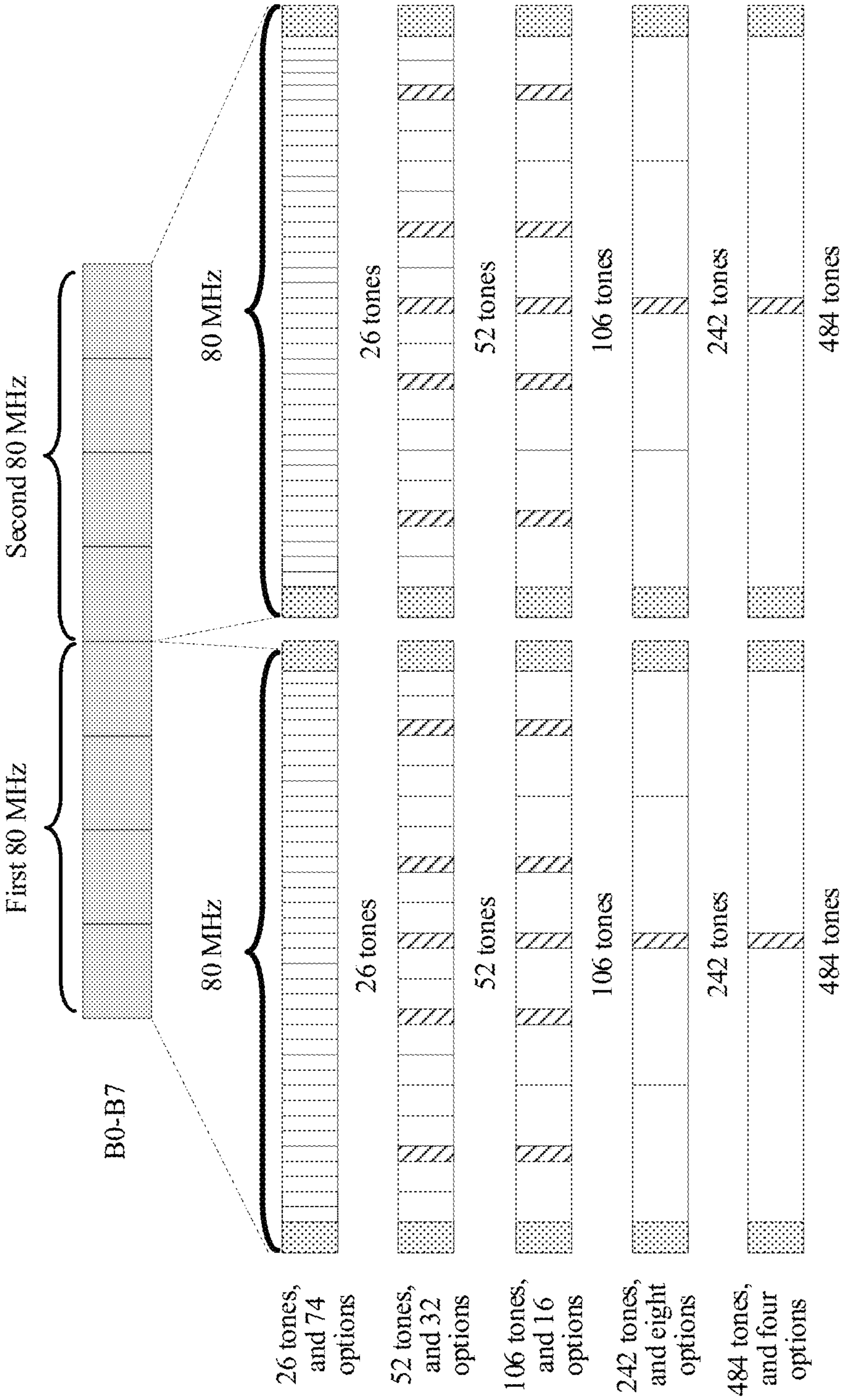
FIG. 4*c* is another diagram of frequency domain resource allocation information in a WLAN system resource indication method according to an embodiment.

An implementation manner 2 is shown in FIG. 4*c*.

The frequency domain resource allocation manner for the 80 MHz bandwidth may be reused for a 160 MHz bandwidth. Therefore, for frequency domain tones on the 160 MHz bandwidth, at least 132 or 134 options are included, and an index with at least 8 bits is needed to identify a frequency domain resource allocation manner.

If a 26-tone RU is used as a frequency domain resource unit, 72 options are included, and there are a total of 72 26-tone RUs on eight 20 MHz bandwidths; or 74 options are included, and there are 72 26-tone RUs on eight 20 MHz bandwidths and two middle 26-tone RUs. If a 52-tone RU is used as a frequency domain resource unit, 32 options are included. If a 106-tone RU is used as a frequency domain resource unit, 16 options are included. If a 242-tone RU is used as a frequency domain resource unit, eight options are included. If a 484-tone RU is used as a frequency domain resource unit, four options are included.

In the implementation manner 2, all frequency domain resource allocation manners of the WLAN system are identified by using indices with 8 bits, and the indices with 8 bits are applicable to 20 MHz, 40 MHz, 80 MHz, and 160 MHz bandwidths.

The 8 bits (B0-B7) of an index are used to indicate a specific location of a frequency domain resource. Indices with 8 bits represent a maximum of 256 options. Therefore, Indices with 8 bits are further reserved for multiple frequency domain resource allocation manners. For example, all tones on an 80 MHz bandwidth are allocated to a user, or all tones on a 160 MHz bandwidth are allocated to a user.

It should be noted that there may be multiple correspondences between an index and a frequency domain resource allocation manner for each user. No specific limitation is imposed herein. Table 8c and Table 8d show one preferred correspondence.

TABLE 8c

| 8-bit index | Message (a frequency domain resource allocation manner for each user) | Number of entries (a quantity of frequency domain resource allocation manners) |
|---|---|---|
| 00000000-01000111 | 26-tone RU (resource unit) | 72 |
| 01001000-01100111 | 52-tone RU (resource unit) | 32 |
| 01101000-01110111 | 106-tone RU (resource unit) | 16 |
| 01111000-01111111 | 242-tone RU (resource unit) | 8 |
| 10000000-10000011 | 484-tone RU (resource unit) | 4 |
| Others | Reserved | |

TABLE 8d

| 8-bit index | Message (a frequency domain resource allocation manner for each user) | Number of entries (a quantity of frequency domain resource allocation manners) |
|---|---|---|
| 00000000-01001001 | 26-tone RU (resource unit) | 74 |
| 01001010-01101001 | 52-tone RU (resource unit) | 32 |
| 01101010-01111001 | 106-tone RU (resource unit) | 16 |
| 01111010-10000001 | 242-tone RU (resource unit) | 8 |
| 10000010-10000101 | 484-tone RU (resource unit) | 4 |
| Others | Reserved | |

In the implementation manner 2, an index with 8 bits is used to indicate frequency domain resource allocation. In the foregoing manner, frequency domain resource allocation of the WLAN system of different bandwidths uses a same frequency resource indexing manner, so as to reduce processing complexity of the WLAN system.

In another embodiment, the spatial flow information includes an index in a spatial flow allocation table. In this way, after obtaining the sub resource indication information of the station, the station may search, according to the index in the spatial flow allocation table, the spatial flow allocation table for a spatial flow allocation manner and a spatial flow sequence number that uniquely correspond to the station. The spatial flow sequence number may be a sequence number of a long training field (Long Training Field, LTF for short), or a matrix row number corresponding to a spatial flow in a P matrix (P Matrix), or a sequence number of a spatial flow in MU-MIMO.

It should be noted that rows in the P matrix are used to differentiate between different spatial flows, and the rows in the P matrix are orthogonal to each other.

In an implementation process, the spatial flow allocation table may be generally preset in the station.

Specifically, the spatial flow allocation table includes allocation manners of different quantities of spatial flows and corresponding indices. A total quantity of spatial flows is specified, but allocation may be performed according to different quantities of spatial flows. Generally, in an SU-MIMO mode, stations continuously use spatial flows in ascending order of spatial flow sequence numbers. In a MU-MIMO mode, station groups continuously use spatial flows in ascending order of spatial flow sequence numbers. A spatial flow allocation table is generated after all possible combinations are traversed.

Eight spatial flows are used as an example, and in the spatial flow allocation table, indices 0 to 7 respectively correspond to eight different allocation manners of a single flow.

Indices 8 to 11 respectively correspond to four different allocation manners of two spatial flows. Preferably, the different allocation manners of two spatial flows are to perform division according to two consecutive adjacent spatial flows in ascending order of sequence numbers, and a same spatial flow is not reused. Therefore, the different allocation manners of two spatial flows include: an allocation manner of spatial flows whose spatial flow sequence numbers are first and second, an allocation manner of spatial flows whose spatial flow sequence numbers are third and fourth, an allocation manner of spatial flows whose spatial flow sequence numbers are fifth and sixth, and an allocation manner of spatial flows whose spatial flow sequence numbers are seventh and eighth.

Indices 12 and 13 respectively correspond to two different allocation manners of three spatial flows. The different allocation manners of three spatial flows are to perform division according to three consecutive adjacent spatial flows in ascending order of sequence numbers, and a same spatial flow is not reused. Therefore, the different allocation manners of three spatial flows include: an allocation manner of spatial flows whose spatial flow sequence numbers are first, second, and third, and an allocation manner of spatial flows whose spatial flow sequence numbers are fourth, fifth, and sixth.

Indices 14 and 15 respectively correspond to two different allocation manners of four spatial flows. The different allocation manners of four spatial flows are to perform division according to four consecutive adjacent spatial flows in ascending order of sequence numbers, and a same spatial flow is not reused. Therefore, the different allocation manners of four spatial flows include: an allocation manner of spatial flows whose spatial flow sequence numbers are first, second, third, and fourth, and an allocation manner of spatial flows whose spatial flow sequence numbers are fifth, sixth, seventh, and eighth.

An index 16 corresponds to one allocation manner of five spatial flows. The allocation manner of five spatial flows includes: an allocation manner of spatial flows whose spatial flow sequence numbers are first, second, third, fourth, and fifth.

An index 17 corresponds to one allocation manner of six spatial flows. The allocation manner of six spatial flows includes: an allocation manner of spatial flows whose spatial flow sequence numbers are first, second, third, fourth, fifth, and sixth.

An index 18 corresponds to one allocation manner of seven spatial flows. The allocation manner of seven spatial flows includes: an allocation manner of spatial flows whose spatial flow sequence numbers are first, second, third, fourth, fifth, sixth, and seventh.

An index 19 corresponds to one allocation manner of eight spatial flows. The allocation manner of eight spatial flows includes: an allocation manner of spatial flows whose spatial flow sequence numbers are first, second, third, fourth, fifth, sixth, seventh, and eighth.

Specifically, the foregoing spatial flow allocation table may be shown in Table 9.

TABLE 9

| Index | Spatial flow allocation manner |
|---|---|
| 0-7 | Eight different allocation manners of a single flow |
| 8-11 | Four different allocation manners of two spatial flows: an allocation manner of spatial flows whose spatial flow sequence numbers are first and second, an allocation manner of spatial flows whose spatial flow sequence numbers are third and fourth, an allocation manner of spatial flows whose spatial flow sequence numbers are fifth and sixth, and an allocation manner of spatial flows whose spatial flow sequence numbers are seventh and eighth |
| 12-13 | Two different allocation manners of three spatial flows: an allocation manner of spatial flows whose spatial flow sequence numbers are first, second, and third, and an allocation manner of spatial flows whose spatial flow sequence numbers are fourth, fifth, and sixth |
| 14-15 | Two different allocation manners of four spatial flows: an allocation manner of spatial flows whose spatial flow sequence numbers are first, second, third, and fourth, and an allocation manner of spatial flows whose spatial flow sequence numbers are fifth, sixth, seventh, and eighth |
| 16 | One allocation manner of five spatial flows: an allocation manner of spatial flows whose spatial flow sequence numbers are first, second, third, fourth, and fifth |
| 17 | One allocation manner of six spatial flows: an allocation manner of spatial flows whose spatial flow sequence numbers are first, second, third, fourth, fifth, and sixth |
| 18 | One allocation manner of seven spatial flows: an allocation manner of spatial flows whose spatial flow sequence numbers are first, second, third, fourth, fifth, sixth, and seventh |
| 19 | One allocation manner of eight spatial flows: an allocation manner of spatial flows whose spatial flow sequence numbers are first, second, third, fourth, fifth, sixth, seventh, and eighth |
| 20-31 | Reserved |

In the foregoing table, each index corresponds to a unique allocation manner. For example, index "0" identifies "an allocation manner of a spatial flow whose spatial flow sequence number is first", and index "8" identifies "an allocation manner of spatial flows whose spatial flow sequence numbers are first and second". Details are not described herein.

In another embodiment, the foregoing spatial flow information may include a bitmap. The bitmap is used to indicate a spatial flow allocation manner and a sequence number that are allocated to the station. Specifically, the bitmap may be used to identify a quantity of allocated spatial flows and corresponding sequence numbers.

The spatial flow sequence number may be a sequence number of an LTF, or a matrix row number corresponding to a spatial flow in a P matrix, or a sequence number of a spatial flow in MU-MIMO.

Based on the foregoing embodiment, the AP independently checks and codes each piece of the sub resource indication information in the resource indication information. In this way, the corresponding station or station group may independently decode each piece of the sub resource indication information, with no need to decode the entire resource indication information. This greatly reduces resource consumption.

Further, the foregoing sub resource indication information may further include: modulation and coding scheme (MCS) information of a corresponding station, indication information about whether to use space time block coding (STBC), indication information about whether to use Low-Density Parity-Check (LDPC) coding, and indication information about whether to use beamforming.

Further, the sub resource indication information may further include an identifier of a corresponding station. In this case, in a process of successively reading pieces of the sub resource indication information, the station may determine, according to the identifier, whether the sub resource indication information belongs to the station. Preferably, the identifier of the corresponding station may be an association identifier (AID) or a partial association identifier (PAID) of the corresponding station. In a specific implementation process, a checking manner may be implemented by scrambling a partial AID information bit with Cyclical Redundancy Check (CRC).

Similarly, for the station group, the sub resource indication information may also carry an identifier of a corresponding station group.

Figure 5:
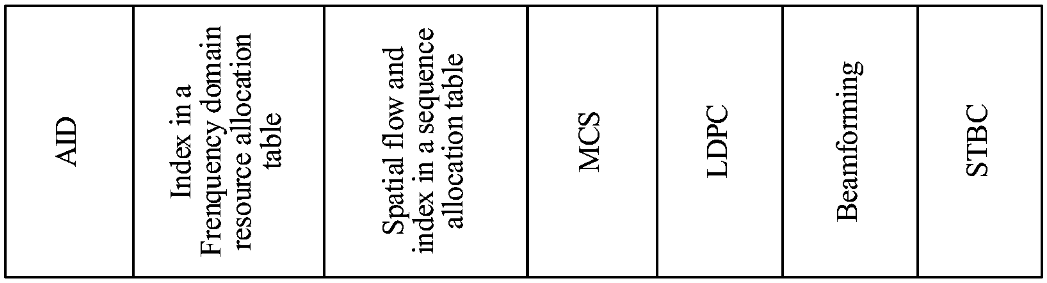
FIG. 5 is a structural diagram of sub resource indication information in a WLAN system resource indication method according to an embodiment.

FIG. 5 is used as an example. FIG. 5 shows a complete piece of sub resource indication information. An AID needs to occupy 11 bits. If the AID needs to be scrambled with CRC, the CRC further needs to occupy 8 bits. An index in a frequency domain resource allocation table may occupy 4 bits, 5 bits, 6 bits, or 7 bits according to different bandwidths of the WLAN system. For details, refer to the foregoing related content about the frequency domain resource allocation table. An index in a spatial flow allocation table needs to occupy 5 bits. MCS information needs to occupy 4 bits. Indication information about whether to use STBC, indication information about whether to use LDPC, and indication information about whether to use beamforming each needs to occupy only 1 bit. This is because only "yes" or "or" needs to be identified. For example, "1" is used to identify "yes", and "0" is used to identify "no". Certainly, the present invention is not limited to what is shown in FIG. 5.

In another embodiment, that the AP sends, to multiple corresponding stations, the frame that carries the resource indication information may be specifically as follows: The AP sends a PPDU to the multiple corresponding stations. The resource indication information is carried in a HE-SIGB part of a Physical Layer Convergence Protocol (PLCP) header field in the PPDU, or carried in a MAC part of the PPDU.

Similarly, if the access point sends, to the multiple station groups, the frame that carries the resource indication information, the AP may also send a PPDU to the multiple corresponding station groups. The resource indication information is carried in a HE-SIGB part of a PLCP header in the PPDU.

The foregoing PPDU may be a trigger frame, or the PPDU may be a data frame that transmits uplink or downlink data.

Figure 6:
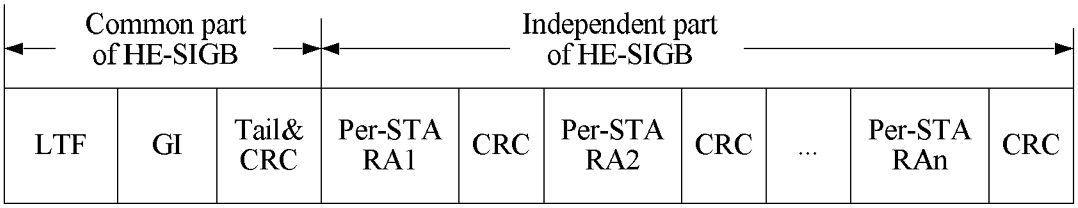
FIG. 6 is a partial structural diagram of a PPDU in a WLAN system resource indication method according to an embodiment.
Figure 7:
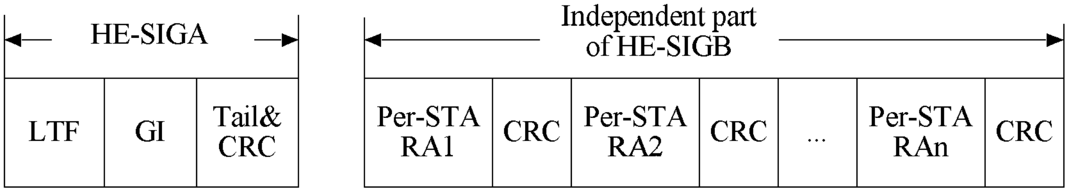
FIG. 7 is a partial structural diagram of another PPDU in a WLAN system resource indication method according to an embodiment.

In FIG. 6 and FIG. 7, a PPDU is used as an example. In a manner shown in FIG. 6, a HE-SIGB part includes a common part and an independent part. The common part has a fixed length, and may include fixed-length information such as long training field (LTF) indication information and guard interval (GI) information of a data part. The common part is independently checked and coded. The independent part includes all pieces of sub resource indication information. For example, a "Per-STA RAn" in FIG. 6 represents one piece of sub resource indication information. A CRC part is added after each piece of sub resource indication information for error check. Tail represents a tail bit. The tail bit is used to bring a coder back to an initial state. The CRC may be used for error check.

In a manner shown in FIG. 7, HE-SIGA of the PPDU includes fixed-length information such as LTF indication information and GI information of a data part. An independent part of HE-SIGB includes all pieces of sub resource indication information.

Information shown in FIG. 5 is information in each piece of sub resource indication information.

Further, in the case in which the AP sends, to the multiple stations, the frame that carries the resource indication information, each piece of sub resource indication information may not include an identifier of a corresponding station, and the identifier of the corresponding station may be indicated in the common part of the HE-SIGB. In the foregoing embodiment, if the AP sends the PPDU to the multiple corresponding stations, the common part of the HE-SIGB part in the PPDU further includes an OFDMA station group identifier (OFDMA STA Group ID) used to indicate the multiple stations.

That is, the multiple stations have a uniform identifier, and all the corresponding stations are mapped to the OFDMA station group identifier.

Correspondingly, before the AP sends the PPDU to the multiple corresponding stations, the AP may send a management frame to the multiple corresponding stations. The management frame is used to indicate the OFDMA station group identifier of the multiple stations to which a corresponding station belongs, and location information of each station in the multiple stations. After receiving the frame that carries the resource indication information, a station side may determine, according to the OFDMA station group identifier that is of the multiple stations to which the station belongs and that is indicated in the management frame, whether the frame that carries the resource indication information and that is received by the station carries resource indication information corresponding to the multiple stations to which the station belongs. If the frame that carries the resource indication information and that is received by the station carries the resource indication information corresponding to the multiple stations to which the station belongs, the station then identifies the sub resource indication information of the station according to a location that is of the station in the multiple stations and that is indicated in the management frame. For example, if the management frame indicates that a specific station is the fifth station in 10 stations, the station determines that the fifth piece of sub resource indication information in the resource indication information is resource indication information of the station, with no need to read other resource indication information.

Figure 8:
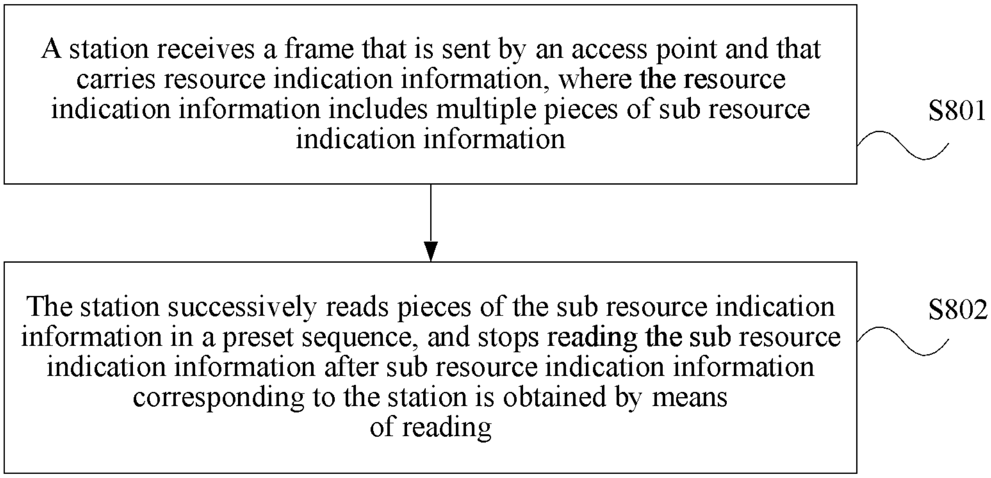
FIG. 8 is a flowchart of Embodiment 2 of a WLAN system resource indication method according to an embodiment.

FIG. 8 is a flowchart of Embodiment 2 of a WLAN system resource indication method according to an embodiment. The method is performed by a station. The station may be the station in the foregoing embodiment. Referring to FIG. 1, the station may be any one of multiple stations corresponding to an AP. The method corresponds to the foregoing method on an AP side. As shown in FIG. 8, the method includes the following steps.

S801: The station receives a frame that is sent by the access point and that carries resource indication information, where the resource indication information includes multiple pieces of sub resource indication information.

S802: The station successively reads pieces of the sub resource indication information in a preset sequence, and stops reading the sub resource indication information after sub resource indication information corresponding to the station is obtained by means of reading.

Specifically, referring to FIG. 6 or FIG. 7, the sub resource indication information in the frame that carries the resource indication information is sorted according to a specific sequence. After receiving the resource indication information, the station may successively read pieces of the sub resource indication information in the preset sequence, for example, in ascending order.

The sub resource indication information includes frequency domain resource allocation information and/or spatial flow information of the corresponding station.

In this embodiment, a station receives a frame that is sent by an access point and that carries resource indication information. The resource indication information includes multiple pieces of sub resource indication information. The station successively reads pieces of the sub resource indication information in a preset sequence, and stops reading the sub resource indication information after sub resource indication information corresponding to the station is obtained by means of reading. In this way, the station does not need to read the entire resource indication information. This greatly reduces resource consumption and improves efficiency.

Further, the foregoing frequency domain resource allocation information includes an index in a frequency domain resource allocation table. Correspondingly, after the sub resource indication information corresponding to the station is obtained by means of reading, the foregoing station searches, according to the index in the frequency domain resource allocation table, the frequency domain resource allocation table for a size and a location of a frequency domain resource unit that uniquely corresponds to the station.

Specifically, the frequency domain resource allocation table includes: frequency domain resource units with multiple different sizes, a quantity of frequency domain resource allocation manners that corresponds to frequency domain resource unit with each size, a location of each sub frequency domain resource that is in an entire frequency domain resource and that is obtained after division performed by using frequency domain resource unit with each size, and the index in the frequency domain resource allocation table. It should be noted that, when the sub frequency domain resources obtained after the division performed by using the different sizes of frequency domain resource units are numbered, indices are not reused.

Frequency domain resource allocation tables vary according to different bandwidths of a WLAN system. For specific content, refer to Table 1 through Table 8. Details are not described herein again.

In another embodiment, the foregoing spatial flow information includes an index in a spatial flow allocation table. Correspondingly, after the sub resource indication information corresponding to the station is obtained by means of reading, the station searches, according to the index in the spatial flow allocation table, the spatial flow allocation table for a spatial flow allocation manner and a spatial flow sequence number that uniquely correspond to the station.

The spatial flow sequence number may be a sequence number of an LTF, or a row number in a P matrix, or a sequence number of a spatial flow in MU-MIMO.

More specifically, the foregoing spatial flow allocation table may include allocation manners of different quantities of spatial flows and corresponding indices. A total quantity of spatial flows is specified, but combination manners are different.

For specific content of the spatial flow allocation table, refer to the foregoing Table 9. Details are not described herein again.

In another embodiment, the foregoing spatial flow information may include a bitmap. The bitmap is used to indicate a spatial flow allocation manner and a spatial flow sequence number that are allocated to the station. Correspondingly, after the sub resource indication information corresponding to the station is obtained by means of reading, the station may determine, according to the bitmap, the spatial flow allocation manner and the spatial flow sequence number that uniquely correspond to the station.

The spatial flow sequence number may be a sequence number of an LTF, or a row number in a P matrix, or a location of a spatial flow in MU-MIMO.

In another embodiment, that the station successively reads pieces of the sub resource indication information in a preset sequence, and stops reading the sub resource indication information after sub resource indication information corresponding to the station is obtained by means of reading may be specifically as follows: the station successively reads pieces of sub resource indication information in the preset sequence, independently decodes each piece of sub resource indication information, and stops reading the sub resource indication information after the sub resource indication information corresponding to the station is obtained.

Further, the foregoing sub resource indication information further includes: MCS information of the station, indication information about whether to use STBC, indication information about whether to use LDPC, and indication information about whether to use beamforming.

In another embodiment, that the station receives a frame that is sent by the access point and that carries resource indication information may be specifically as follows: the foregoing station receives a PPDU that is sent by the access point and that carries the resource indication information. The resource indication information is carried in a HE-SIGB part of a PLCP header in the PPDU, or a MAC part of the PPDU.

The PPDU may be a trigger frame, or the PPDU may be a data frame that transmits uplink or downlink data.

In addition, in order that the station can identify the sub resource indication information of the station, the sub resource indication information further includes an identifier of a corresponding station. The identifier may be an AID or a PAID.

Certainly, each piece of the sub resource indication information may not carry the identifier of the corresponding station, and the frame that carries the resource indication information carries identifiers of all the stations.

Specifically, a common part of the HE-SIGB part in the PPDU further includes an OFDMA station group identifier used to indicate the multiple stations.

Further, before receiving the frame that carries the resource indication information, the station receives a management frame sent by the AP. The management frame is used to indicate the OFDMA station group identifier of the multiple stations to which a corresponding station belongs, and location information of each station in the multiple stations.

Correspondingly, that the station successively reads pieces of the sub resource indication information in a preset sequence, and stops reading the sub resource indication information after sub resource indication information corresponding to the station is obtained by means of reading may be specifically as follows: the station reads, according to the OFDMA station group identifier that is of the multiple stations to which the station belongs and that is indicated in the management frame and according to the location information that is of each station in the multiple stations and that is indicated in the management frame, the sub resource indication information that is in the resource indication information and that corresponds to the station.

That is, the station first determines, according to the OFDMA station group identifier, whether the station belongs to the multiple stations. If the station belongs to the multiple stations, the station continues to determine, according to the location information that is of the station and that is indicated in the management frame, which piece of the sub resource indication information belongs to the station; and after completing the determining, directly reads the sub resource indication information corresponding to the station, with no need to read other sub resource indication information. In this manner, resource consumption may be better reduced.

Figure 9:
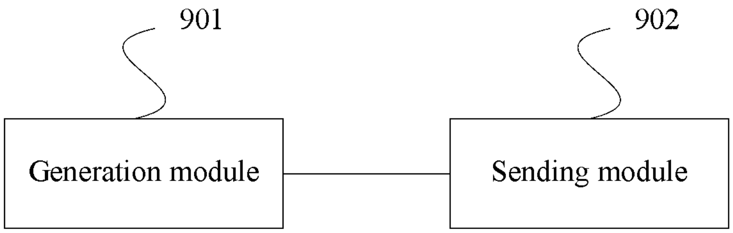
FIG. 9 is a structural diagram of Embodiment 1 of a WLAN system resource indication apparatus according to an embodiment.

FIG. 9 is a structural diagram of Embodiment 1 of a WLAN system resource indication apparatus according to an embodiment. The apparatus may be integrated in the access point in the foregoing embodiment. As shown in FIG. 9, the apparatus includes a generation module 901 and a sending module 902.

The generation module 901 is configured to generate a frame that carries resource indication information.

The sending module 902 is configured to send, to multiple stations, the frame that carries the resource indication information, where the resource indication information includes multiple pieces of sub resource indication information, correspondingly, each piece of the sub resource indication information uniquely corresponds to one of the multiple stations, and the sub resource indication information includes frequency domain resource allocation information and/or spatial flow information of a corresponding station; or send, to multiple station groups, the frame that carries the resource indication information, where the resource indication information includes multiple pieces of sub resource indication information, correspondingly, each piece of the sub resource indication information uniquely corresponds to one of the multiple station groups, and the sub resource indication information includes frequency domain resource allocation information and/or spatial flow information of a corresponding station group.

The apparatus is configured to perform the foregoing method embodiment on an access point side. Their implementation principles and technical effects are similar, and details are not described herein again.

The frequency domain resource allocation information includes an index in a frequency domain resource allocation table, so that the station searches, according to the index in the frequency domain resource allocation table, the frequency domain resource allocation table for a size and a location of a frequency domain resource unit that uniquely corresponds to the station, or the station group searches, according to the index in the frequency domain resource allocation table, the frequency domain resource allocation table for a size and a location of a frequency domain resource unit that uniquely corresponds to the station group. The frequency domain resource allocation table includes: multiple different sizes of frequency domain resource units with multiple different sizes, a quantity of frequency domain resource allocation manners that corresponds to frequency domain resource unit with each size, a location of each sub frequency domain resource that is in an entire frequency domain resource and that is obtained after division performed by using frequency domain resource unit with each size, and the index in the frequency domain resource allocation table.

For specific content of the frequency domain resource allocation table, refer to Table 1 through Table 8. Details are not described herein again.

Further, the spatial flow information includes an index in a spatial flow allocation table, so that the station searches, according to the index in the spatial flow allocation table, the spatial flow allocation table for a spatial flow allocation manner and a spatial flow sequence number that uniquely correspond to the station.

The spatial flow sequence number is a sequence number of an LTF, or a matrix row number corresponding to a spatial flow in a P matrix, or a sequence number of a spatial flow in MU-MIMO.

Specifically, the spatial flow allocation table includes allocation manners of different quantities of spatial flows and corresponding indices.

For specific content of the foregoing spatial flow allocation table, refer to the content of the foregoing Table 9. Details are not described herein again.

In another embodiment, the spatial flow information includes a bitmap. The bitmap is used to indicate a spatial flow allocation manner and a spatial flow sequence number that are allocated to a corresponding station. The spatial flow sequence number is a sequence number of an LTF, or a matrix row number corresponding to a spatial flow in a P matrix, or a sequence number of a spatial flow in MU-MIMO.

Further, the foregoing sub resource indication information may further include: MCS information of a corresponding station, indication information about whether to use STBC, indication information about whether to use LDPC, indication information about whether to use beamforming, and the like.

Figure 10:
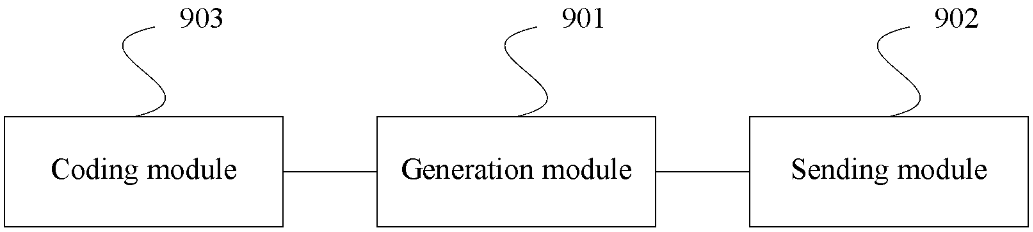
FIG. 10 is a structural diagram of Embodiment 2 of a WLAN system resource indication apparatus according to an embodiment.

FIG. 10 is a structural diagram of Embodiment 2 of a WLAN system resource indication apparatus according to an embodiment. As shown in FIG. 10, based on FIG. 9, the apparatus may further include: a coding module 903, configured to independently check and code each piece of the sub resource indication information in the resource indication information.

Further, the sub resource indication information further includes an identifier of a corresponding station. The identifier may be an AID or a PAID.

In another embodiment, the sending module 902 is specifically configured to: send, to the multiple stations, a PPDU that carries the resource indication information; or send, to the multiple station groups, a PPDU that carries the resource indication information.

The resource indication information is carried in a HE-SIGB part of a PLCP header field in the PPDU, or a MAC part of the PPDU.

The PPDU may be a trigger frame, or a data frame that transmits uplink/downlink data. However, the present invention is not limited thereto.

In another embodiment, a common part of the HE-SIGB part in the PPDU further includes an orthogonal frequency division multiple access OFDMA station group identifier used to indicate the multiple stations. Correspondingly, the sending module 902 is further configured to: before sending the PPDU to the multiple stations, send a management frame to the multiple stations. The management frame is used to indicate the OFDMA station group identifier of the multiple stations to which a corresponding station belongs, and location information of each station in the multiple stations.

Figure 11:
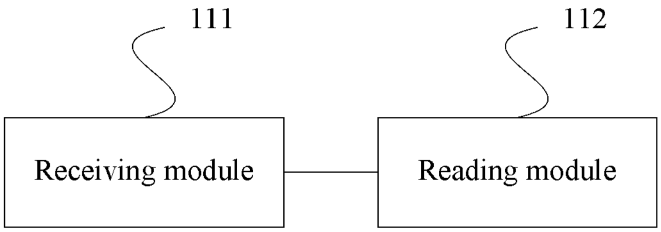
FIG. 11 is a structural diagram of Embodiment 3 of a WLAN system resource indication apparatus according to an embodiment.

FIG. 11 is a structural diagram of Embodiment 3 of a WLAN system resource indication apparatus according to an embodiment. The apparatus may be integrated in the station in the foregoing embodiment. As shown in FIG. 11, the apparatus includes a receiving module 111 and a reading module 112.

The receiving module 111 is configured to receive a frame that is sent by an access point and that carries resource indication information. The resource indication information includes multiple pieces of sub resource indication information.

The reading module 112 is configured to successively read pieces of the sub resource indication information in a preset sequence, and stop reading the sub resource indication information after sub resource indication information corresponding to the station is obtained by means of reading.

The sub resource indication information includes frequency domain resource allocation information and/or spatial flow information of a corresponding station.

Figure 12:
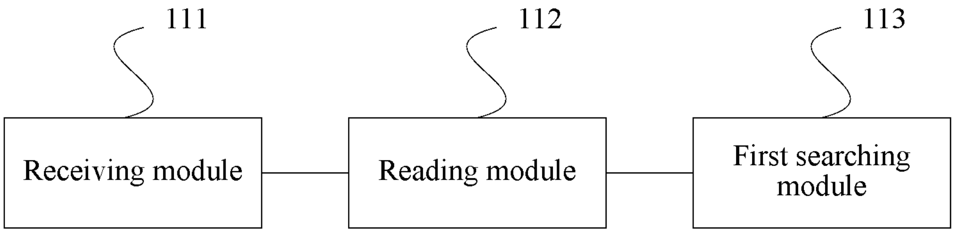
FIG. 12 is a structural diagram of Embodiment 4 of a WLAN system resource indication apparatus according to an embodiment.

FIG. 12 is a structural diagram of Embodiment 4 of a WLAN system resource indication apparatus according to an embodiment. The frequency domain resource allocation information includes an index in a frequency domain resource allocation table.

Based on FIG. 11, the apparatus may further include a first searching module 113.

The first searching module 113 is configured to search, according to the index in the frequency domain resource allocation table, the frequency domain resource allocation table for a size and a location of a frequency domain resource unit that uniquely corresponds to the station.

The frequency domain resource allocation table includes: frequency domain resource units with multiple different sizes, a quantity of frequency domain resource allocation manners that corresponds to frequency domain resource unit with each size, a location of each sub frequency domain resource that is in an entire frequency domain resource and that is obtained after division performed by using frequency domain resource unit with each size, and the index in the frequency domain resource allocation table.

For related content of the frequency domain resource allocation table, refer to the foregoing Table 1 through Table 8. Details are not described herein again.

Figure 13:
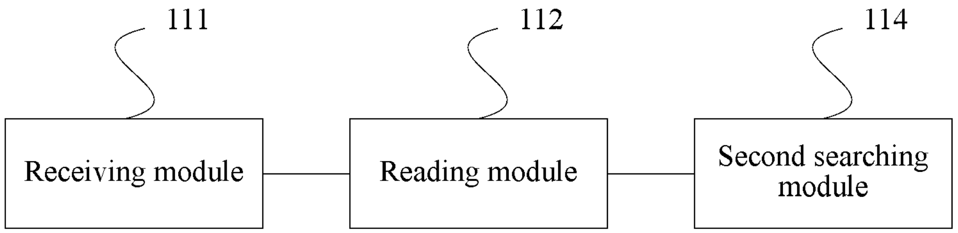
FIG. 13 is a structural diagram of Embodiment 5 of a WLAN system resource indication apparatus according to an embodiment.

FIG. 13 is a structural diagram of Embodiment 5 of a WLAN system resource indication apparatus according to an embodiment. The spatial flow information includes an index in a spatial flow allocation table. Correspondingly, based on FIG. 11, the foregoing apparatus may further include a second searching module 114.

The second searching module 114 is configured to search, according to the index in the spatial flow allocation table, the spatial flow allocation table for a spatial flow allocation manner and a spatial flow sequence number that uniquely correspond to the station. The spatial flow sequence number is a sequence number of an LTF, or a matrix row number corresponding to a spatial flow in a P matrix, or a sequence number of a spatial flow in MU-MIMO. The spatial flow allocation table includes allocation manners of different quantities of spatial flows and corresponding indices.

For related content of the spatial flow allocation table, refer to the foregoing Table 9. Details are not described herein again.

Figure 14:
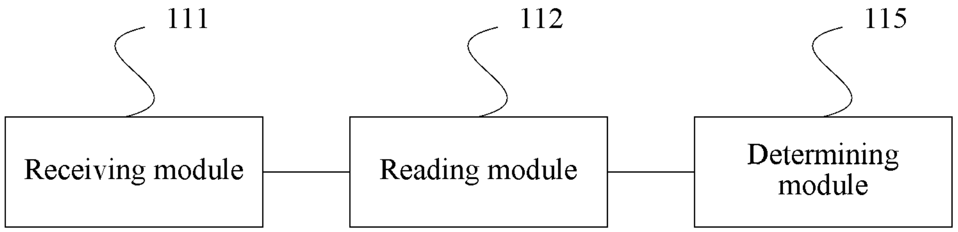
FIG. 14 is a structural diagram of Embodiment 6 of a WLAN system resource indication apparatus according to an embodiment.

FIG. 14 is a structural diagram of Embodiment 6 of a WLAN system resource indication apparatus according to an embodiment. The spatial flow information includes a bitmap, and the bitmap is used to indicate a spatial flow allocation manner and a spatial flow sequence number that are allocated to the station. Correspondingly, based on FIG. 11, the foregoing apparatus may further include a determining module 115.

The determining module 115 is configured to determine, according to the bitmap, the spatial flow allocation manner and the spatial flow sequence number that uniquely correspond to the station. The spatial flow sequence number is a sequence number of an LTF, or a matrix row number corresponding to a spatial flow in a P matrix, or a sequence number of a spatial flow in MU-MIMO.

Further, the foregoing sub resource indication information may further include: MCS information of a corresponding station, indication information about whether to use STBC, indication information about whether to use LDPC, indication information about whether to use beamforming, and the like.

Further, the sub resource indication information further includes an identifier of a corresponding station. The identifier may be an AID or a PAID.

In another embodiment, the reading module 112 is specifically configured to successively read pieces of the sub resource indication information in the preset sequence, independently decode each piece of the sub resource indication information, and stop reading the sub resource indication information after the sub resource indication information corresponding to the station is obtained.

In another embodiment, the receiving module 111 is specifically configured to receive a PPDU that carries the resource indication information. The resource indication information is carried in a HE-SIGB part of a PLCP header field in the PPDU, or a MAC part of the PPDU. The PPDU may be a trigger frame, or a data frame that transmits uplink/downlink data.

Based on the foregoing embodiment, a common part of the HE-SIGB part in the PPDU may further include an OFDMA station group identifier used to indicate the multiple stations.

The receiving module 111 is further configured to receive a management frame sent by the access point. The management frame is used to indicate the OFDMA station group identifier of the multiple stations to which a corresponding station belongs, and location information of each station in the multiple stations.

The reading module 112 is configured to read, according to the OFDMA station group identifier that is of the multiple stations to which the station belongs and that is indicated in the management frame and according to the location information that is of the station in the multiple stations and that is indicated in the management frame, the sub resource indication information that is in the resource indication information and that corresponds to the station.

Figure 15:
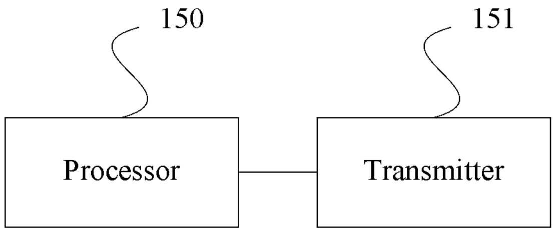
FIG. 15 is a schematic structural diagram of Embodiment 7 of a WLAN system resource indication apparatus according to an embodiment.

FIG. 15 is a structural diagram of Embodiment 7 of a WLAN system resource indication apparatus according to an embodiment. The apparatus may be integrated in an access point. As shown in FIG. 15, the apparatus may include a processor 150 and a transmitter 151. The apparatus is configured to perform the method embodiment on an access point side. Their implementation principles and technical effects are similar. The transmitter 151 sends data to a station side, and operations are all performed by the processor 150.

The processor 150 is configured to generate a frame that carries resource indication information. The transmitter 151 is configured to send, to multiple stations, the frame that carries the resource indication information, where the resource indication information includes multiple pieces of sub resource indication information, correspondingly, each piece of the sub resource indication information uniquely corresponds to one of the multiple stations, and the sub resource indication information includes frequency domain resource allocation information and/or spatial flow information of a corresponding station; or send, to multiple station groups, the frame that carries the resource indication information, where the resource indication information includes multiple pieces of sub resource indication information, correspondingly, each piece of the sub resource indication information uniquely corresponds to one of the multiple station groups, and the sub resource indication information includes frequency domain resource allocation information and/or spatial flow information of a corresponding station group.

For related content of the resource indication information, refer to the foregoing embodiment. Details are not described herein again.

The processor 150 is further configured to independently check and code each piece of the sub resource indication information in the resource indication information.

The transmitter 151 is specifically configured to: send, to the multiple stations, a physical layer protocol data unit PPDU that carries the resource indication information; or send, to the multiple station groups, a PPDU that carries the resource indication information.

The resource indication information is carried in a HE-SIGB part of a Physical Layer Convergence Protocol PLCP header field in the PPDU, or a MAC part of the PPDU. The PPDU is a trigger frame, or a data frame that transmits uplink/downlink data.

A common part of the HE-SIGB part in the PPDU further includes an OFDMA station group identifier used to indicate the multiple stations.

The transmitter 151 is further configured to: before sending the PPDU to the multiple stations, send a management frame to the multiple stations. The management frame is used to indicate the OFDMA station group identifier of the multiple stations to which a corresponding station belongs, and location information of each station in the multiple stations.

Figure 16:
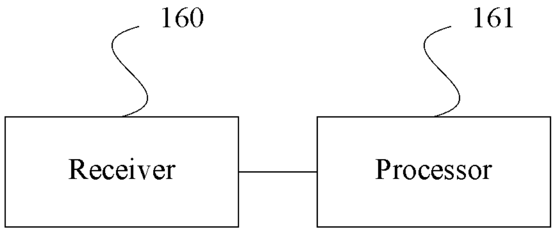
FIG. 16 is a schematic structural diagram of Embodiment 8 of a WLAN system resource indication apparatus according to an embodiment.

FIG. 16 is a structural diagram of Embodiment 8 of a WLAN system resource indication apparatus according to an embodiment. The apparatus may be integrated on a station side. As shown in FIG. 16, the apparatus may include a receiver 160 and a processor 161. The apparatus is configured to perform the foregoing method on a station side. Their implementation principles and technical effects are similar. The receiver 160 receives data sent by an AP side, and other operation is all performed by the processor 161.

The receiver 160 is configured to receive a frame that is sent by an access point and that carries resource indication information. The resource indication information includes multiple pieces of sub resource indication information. The processor 161 is configured to successively read pieces of the sub resource indication information in a preset sequence, and stop reading the sub resource indication information after sub resource indication information corresponding to a station is obtained by means of reading.

The sub resource indication information includes frequency domain resource allocation information and/or spatial flow information of a corresponding station.

For related content of the resource indication information, refer to the foregoing embodiment. Details are not described herein again.

It should be noted that, based on the foregoing method and apparatus embodiments, the foregoing sub resource indication information may include frequency domain resource allocation information and/or spatial flow information of a corresponding station.

Each piece of the sub resource indication information corresponds to one station of multiple stations.

In the several embodiments according to an embodiment, it should be understood that the disclosed apparatus and method may be implemented in other manners. For example, the described apparatus embodiment is merely an example. For example, the unit division is merely a logical function division and may be other divisions in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

The invention claimed is:

1. A Wireless Local Area Network (WLAN) system resource indication method, comprising:

generating, by an access point, a frame that carries resource indication information; and sending, by the access point to multiple stations, the frame that carries the resource indication information;

wherein the resource indication information comprises multiple pieces of sub resource indication information, each piece of the sub resource indication information comprises:

an identifier of one station of the multiple stations and frequency domain resource allocation information of the one station;

wherein the frequency domain resource allocation information indicates a size and a location of one frequency domain resource unit (RU) in a bandwidth of the WLAN system; and wherein the frequency domain resource allocation information comprises one index, for different bandwidths of the WLAN system, the index is one of multiple indexes, and the multiple indexes comprise:

indexes "0-36", each of which indicates a RU of 26 tones allocated to the one station;

indexes "37-52", each of which indicates a RU of 52 tones allocated to the one station;

indexes "53-60", each of which indicates a RU of 106 tones allocated to the one station;

indexes "61-64", each of which indicates a RU of 242 tones allocated to the one station;

indexes "65-66", each of which indicates a RU of 484 tones allocated to the one station.

2. The method according to claim 1, wherein the bandwidth of the WLAN system is 20 MHz, sizes of frequency domain resource units comprise 26 tones, 52 tones, 106 tones, and 242 tones;

wherein nine of the indexes "0-36" are used for the RUs of 26 tones located in the 20 MHz bandwidth;

wherein four of the indexes "37-52" are used for the RUs of 52 tones located in the 20 MHz bandwidth;

wherein two of the indexes "53-60" are used for the RUs of 106 tones located in the 20 MHz bandwidth; and wherein one of the indexes "61-64" is used for the RU of 242 tones located in the 20 MHz bandwidth.

3. The method according to claim 1, wherein the bandwidth of the WLAN system is 40 MHz, sizes of frequency domain resource units comprise 26 tones, 52 tones, 106 tones, 242 tones, and 484 tones;

wherein eighteen of the indexes "0-36" are used for the RUs of 26 tones located in the 40 MHz bandwidth;

wherein eight of the indexes "37-52" are used for the RUs of 52 tones located in the 40 MHz bandwidth;

wherein four of the indexes "53-60" are used for the RUs of 106 tones located in the 40 MHz bandwidth;

wherein two of the indexes "61-64" are used for the RUs of 242 tones located in the 40 MHz bandwidth; and wherein one of the indexes "65-66" is used for the RU of 484 tones located in the 40 MHz bandwidth.

4. The method according to claim 1, wherein the bandwidth of the WLAN system is 80 MHz, 160 MHz or 80+80 MHz, sizes of frequency domain resource units comprise 26 tones, 52 tones, 106 tones, 242 tones and 484 tones;

wherein thirty-seven of the indexes "0-36" are used for the RUs of 26 tones located in a 80 MHz bandwidth;

wherein sixteen of the indexes "37-52" are used for the RUs of 52 tones located in a 80 MHz bandwidth;

wherein eight of the indexes "53-60" are used for the RUs of 106 tones located in a 80 MHz bandwidth;

wherein four of the indexes "61-64" are used for the RUs of 242 tones located in a 80 MHz bandwidth; and wherein two of the indexes "65-66" are used for the RUs of 484 tones located in a 80 MHz bandwidth.

5. The method according to claim 1, wherein the bandwidth of the WLAN system is 160 MHz or 80+80 MHz, a bit is used to differentiate between two 80 MHz bandwidths, wherein the bit is set to "O" to indicate a first 80 MHz bandwidth, and is set to "1" to indicate a second 80 MHz bandwidth.

6. The method according to claim 1, wherein the frequency domain resource allocation information comprises 7 bits that are used to represent the index.

7. A Wireless Local Area Network (WLAN) system apparatus, comprising:

a processor configured to generate a frame that carries resource indication information; and a transmitter configured to send, to multiple stations, the frame that carries the resource indication information;

wherein the resource indication information comprises multiple pieces of sub resource indication information, each piece of the sub resource indication information comprises:

an identifier of one station of the multiple stations and frequency domain resource allocation information of the one station;

wherein the frequency domain resource allocation information indicates a size and a location of one frequency domain resource unit (RU) in a bandwidth of the WLAN system; and wherein the frequency domain resource allocation information comprises one index, for different bandwidths of the WLAN system, the index is one of multiple indexes, and the multiple indexes comprise:

indexes "0-36", each of which indicates a RU of 26 tones allocated to the one station;

indexes "37-52", each of which indicates a RU of 52 tones allocated to the one station;

indexes "53-60", each of which indicates a RU of 106 tones allocated to the one station;

indexes "61-64", each of which indicates a RU of 242 tones allocated to the one station;

indexes "65-66", each of which indicates a RU of 484 tones allocated to the one station.

8. The apparatus according to claim 7, wherein the bandwidth of the WLAN system is 20 MHz, sizes of frequency domain resource units comprise 26 tones, 52 tones, 106 tones, and 242 tones;

wherein nine of the indexes "0-36" are used for the RUs of 26 tones located in the 20 MHz bandwidth;

wherein four of the indexes "37-52" are used for the RUs of 52 tones located in the 20 MHz bandwidth;

wherein two of the indexes "53-60" are used for the RUs of 106 tones located in the 20 MHz bandwidth; and wherein one of the indexes "61-64" is used for the RU of 242 tones located in the 20 MHz bandwidth.

9. The apparatus according to claim 7, wherein the bandwidth of the WLAN system is 40 MHz, sizes of frequency domain resource units comprise 26 tones, 52 tones, 106 tones, 242 tones, and 484 tones;

wherein eighteen of the indexes "0-36" are used for the RUs of 26 tones located in the 40 MHz bandwidth;

wherein eight of the indexes "37-52" are used for the RUs of 52 tones located in the 40 MHz bandwidth;

wherein four of the indexes "53-60" are used for the RUs of 106 tones located in the 40 MHz bandwidth;

wherein two of the indexes "61-64" are used for the RUs of 242 tones located in the 40 MHz bandwidth; and wherein one of the indexes "65-66" is used for the RU of 484 tones located in the 40 MHz bandwidth.

10. The apparatus according to claim 7, wherein the bandwidth of a WLAN system is 80 MHz, 160 MHz or 80+80 MHz, sizes of frequency domain resource units comprise 26 tones, 52 tones, 106 tones, 242 tones and 484 tones;

wherein thirty-seven of the indexes "0-36" are used for the RUs of 26 tones located in a 80 MHz bandwidth;

wherein sixteen of the indexes "37-52" are used for the RUs of 52 tones located in a 80 MHz bandwidth;

wherein eight of the indexes "53-60" are used for the RUs of 106 tones located in a 80 MHz bandwidth;

wherein four of the indexes "61-64" are used for the RUs of 242 tones located in a 80 MHz bandwidth; and wherein two of the indexes "65-66" are used for the RUs of 484 tones located in a 80 MHz bandwidth.

11. The apparatus according to claim 7, wherein the bandwidth of the WLAN system is 160 MHz or 80+80 MHz, a bit is used to differentiate between two 80 MHz bandwidths, wherein the bit is set to "0" to indicate a first 80 MHz bandwidth, and is set to "1" to indicate a second 80 MHz bandwidth.

12. The apparatus according to claim 7, wherein the frequency domain resource allocation information comprises 7 bits that are used to represent the index.

13. A non-transitory computer-readable media storing computer instructions for a Wireless Local Area Network (WLAN) system resource indication in an access point, that when executed by one or more processors, cause the one or more processors to perform the steps of:

generating a frame that carries resource indication information; and sending, to multiple stations, the frame that carries the resource indication information, wherein the resource indication information comprises multiple pieces of sub resource indication information, each piece of the sub resource indication information comprises:

an identifier of one station of the multiple stations and frequency domain resource allocation information of the one station;

wherein the frequency domain resource allocation information indicates a size and a location of one frequency domain resource unit (RU) in a bandwidth of the WLAN system;

wherein the frequency domain resource allocation information comprises one index, for different bandwidths of the WLAN system, the index is one of multiple indexes, and the multiple indexes comprise:

indexes "0-36", each of which indicates a RU of 26 tones allocated to the one station;

indexes "37-52", each of which indicates a RU of 52 tones allocated to the one station;

indexes "53-60", each of which indicates a RU of 106 tones allocated to the one station;

indexes "61-64", each of which indicates a RU of 242 tones allocated to the one station;

indexes "65-66", each of which indicates a RU of 484 tones allocated to the one station.

14. The non-transitory computer-readable media according to claim 13, wherein the bandwidth of the WLAN system is 20 MHz, sizes of frequency domain resource units comprise 26 tones, 52 tones, 106 tones, and 242 tones;

wherein nine of the indexes "0-36" are used for the RUs of 26 tones located in the 20 MHz bandwidth;

wherein four of the indexes "37-52" are used for the RUs of 52 tones located in the 20 MHz bandwidth;

wherein two of the indexes "53-60" are used for the RUs of 106 tones located in the 20 MHz bandwidth; and wherein one of the indexes "61-64" is used for the RU of 242 tones located in the 20 MHz bandwidth.

15. The non-transitory computer-readable media according to claim 13, wherein the bandwidth of the WLAN system is 40 MHz, sizes of frequency domain resource units comprise 26 tones, 52 tones, 106 tones, 242 tones, and 484 tones;

wherein eighteen of the indexes "0-36" are used for the RUs of 26 tones located in the 40 MHz bandwidth;

wherein eight of the indexes "37-52" are used for the RUs of 52 tones located in the 40 MHz bandwidth;

wherein four of the indexes "53-60" are used for the RUs of 106 tones located in the 40 MHz bandwidth;

wherein two of the indexes "61-64" are used for the RUs of 242 tones located in the 40 MHz bandwidth; and wherein one of the indexes "65-66" is used for the RU of 484 tones located in the 40 MHz bandwidth.

16. The non-transitory computer-readable media according to claim 13, wherein the bandwidth of the WLAN system is 80 MHz, 160 MHz or 80+80 MHz, sizes of frequency domain resource units comprise 26 tones, 52 tones, 106 tones, 242 tones and 484 tones;

wherein thirty-seven of the indexes "0-36" are used for the RUs of 26 tones located in a 80 MHz bandwidth;

wherein sixteen of the indexes "37-52" are used for the RUs of 52 tones located in a 80 MHz bandwidth;

wherein eight of the indexes "53-60" are used for the RUs of 106 tones located in a 80 MHz bandwidth;

wherein four of the indexes "61-64" are used for the RUs of 242 tones located in a 80 MHz bandwidth; and wherein two of the indexes "65-66" are used for the RUs of 484 tones located in a 80 MHz bandwidth.

17. The non-transitory computer-readable media according to claim 13, when the bandwidth of the WLAN system is 160 MHz or 80+80 MHz, a bit is used to differentiate between two 80 MHz bandwidths, wherein the bit is set to "0" to indicate a first 80 MHz bandwidth, and is set to "1" to indicate a second 80 MHz bandwidth.

18. The non-transitory computer-readable media according to claim 13, wherein the frequency domain resource allocation information comprises 7 bits that are used to represent the index.

19. A Wireless Local Area Network (WLAN) system resource indication method, comprising:

receiving, by a station, a frame that is sent by an access point and that carries resource indication information, wherein the resource indication information comprises multiple pieces of sub resource indication information; and reading, by the station, pieces of the sub resource indication information;

wherein each piece of the sub resource indication information comprises: an identifier of one station of the multiple stations and frequency domain resource allocation information of the one station;

wherein the frequency domain resource allocation information indicates a size and a location of one frequency domain resource unit (RU) in a bandwidth of the WLAN system; and wherein the frequency domain resource allocation information comprises one index, for different bandwidths of the WLAN system, the index is one of multiple indexes in the following:

indexes "0-36", each of which indicates a RU of 26 tones allocated to the one station;

indexes "37-52", each of which indicates a RU of 52 tones allocated to the one station;

indexes "53-60", each of which indicates a RU of 106 tones allocated to the one station;

indexes "61-64", each of which indicates a RU of 242 tones allocated to the one station;

indexes "65-66", each of which indicates a RU of 484 tones allocated to the one station.

20. The method according to claim 19, wherein the bandwidth of the WLAN system is 20 MHz, sizes of frequency domain resource units comprise 26 tones, 52 tones, 106 tones, and 242 tones;

wherein nine of the indexes "0-36" are used for the RUs of 26 tones located in the 20 MHz bandwidth;

wherein four of the indexes "37-52" are used for the RUs of 52 tones located in the 20 MHz bandwidth;

wherein two of the indexes "53-60" are used for the RUs of 106 tones located in the 20 MHz bandwidth; and wherein one of the indexes "61-64" is used for the RU of 242 tones located in the 20 MHz bandwidth.

21. The method according to claim 19, wherein the bandwidth of the WLAN system is 40 MHz, sizes of frequency domain resource units comprise 26 tones, 52 tones, 106 tones, 242 tones, and 484 tones;

wherein eighteen of the indexes "0-36" are used for the RUs of 26 tones located in the 40 MHz bandwidth;

wherein eight of the indexes "37-52" are used for the RUs of 52 tones located in the 40 MHz bandwidth;

wherein four of the indexes "53-60" are used for the RUs of 106 tones located in the 40 MHz bandwidth;

wherein two of the indexes "61-64" are used for the RUs of 242 tones located in the 40 MHz bandwidth; and wherein one of the indexes "65-66" is used for the RU of 484 tones located in the 40 MHz bandwidth.

22. The method according to claim 19, wherein the bandwidth of the WLAN system is 80 MHz, 160 MHz or 80+80 MHz, sizes of frequency domain resource units comprise 26 tones, 52 tones, 106 tones, 242 tones and 484 tones;

wherein thirty-seven of the indexes "0-36" are used for the RUs of 26 tones located in a 80 MHz bandwidth;

wherein sixteen of the indexes "37-52" are used for the RUs of 52 tones located in a 80 MHz bandwidth;

wherein eight of the indexes "53-60" are used for the RUs of 106 tones located in a 80 MHz bandwidth;

wherein four of the indexes "61-64" are used for the RUs of 242 tones located in a 80 MHz bandwidth; and wherein two of the indexes "65-66" are used for the RUs of 484 tones located in a 80 MHz bandwidth.

23. The method according to claim 19, wherein the bandwidth of the WLAN system is 160 MHz or 80+80 MHz, a bit is used to differentiate between two 80 MHz bandwidths, wherein the bit is set to "0" to indicate a first 80 MHz bandwidth, and "1" to indicate a second 80 MHz bandwidth.

24. The method according to claim 19, wherein the frequency domain resource allocation information comprises 7 bits that are used to represent the index.

25. A Wireless Local Area Network (WLAN) system apparatus, comprising:

a receiver, configured to receive a frame that carries resource indication information, wherein the resource indication information comprises multiple pieces of sub resource indication information; and a processor, configured to read pieces of the sub resource indication information in a preset sequence;

each piece of the sub resource indication information comprises: an identifier of one station of the multiple stations and frequency domain resource allocation information of the one station;

wherein the frequency domain resource allocation information indicates a size and a location of one frequency domain resource unit (RU) in a bandwidth of the WLAN system; and wherein the frequency domain resource allocation information comprises one index, for different bandwidths of the WLAN system, the index is one of multiple indexes, and the multiple indexes comprise:

indexes "0-36", each of which indicates a RU of 26 tones allocated to the one station;

indexes "37-52", each of which indicates a RU of 52 tones allocated to the one station;

indexes "53-60", each of which indicates a RU of 106 tones allocated to the one station;

indexes "61-64", each of which indicates a RU of 242 tones allocated to the one station;

indexes "65-66", each of which indicates a RU of 484 tones allocated to the one station.

26. The apparatus according to claim 25, wherein the bandwidth of the WLAN system is 20 MHz, sizes of frequency domain resource units comprise 26 tones, 52 tones, 106 tones, and 242 tones;

wherein nine of the indexes "0-36" are used for the RUs of 26 tones located in the 20 MHz bandwidth;

wherein four of the indexes "37-52" are used for the RUs of 52 tones located in the 20 MHz bandwidth;

wherein two of the indexes "53-60" are used for the RUs of 106 tones located in the 20 MHz bandwidth; and wherein one of the indexes "61-64" is used for the RU of 242 tones located in the 20 MHz bandwidth.

27. The apparatus according to claim 25, wherein the bandwidth of the WLAN system is 40 MHz, sizes of frequency domain resource units comprise 26 tones, 52 tones, 106 tones, 242 tones, and 484 tones;

wherein eighteen of the indexes "0-36" are used for the RUs of 26 tones located in the 40 MHz bandwidth;

wherein eight of the indexes "37-52" are used for the RUs of 52 tones located in the 40 MHz bandwidth;

wherein four of the indexes "53-60" are used for the RUs of 106 tones located in the 40 MHz bandwidth;

wherein two of the indexes "61-64" are used for the RUs of 242 tones located in the 40 MHz bandwidth; and wherein one of the indexes "65-66" is used for the RU of 484 tones located in the 40 MHz bandwidth.

28. The apparatus according to claim 25, wherein the bandwidth of the WLAN system is 80 MHz, 160 MHz or 80+80 MHz, sizes of frequency domain resource units comprise 26 tones, 52 tones, 106 tones, 242 tones and 484 tones;

wherein thirty-seven of the indexes "0-36" are used for the RUs of 26 tones located in a 80 MHz bandwidth;

wherein sixteen of the indexes "37-52" are used for the RUs of 52 tones located in a 80 MHz bandwidth;

wherein eight of the indexes "53-60" are used for the RUs of 106 tones located in a 80 MHz bandwidth;

wherein four of the indexes "61-64" are used for the RUs of 242 tones located in a 80 MHz bandwidth; and wherein two of the indexes "65-66" are used for the RUs of 484 tones located in a 80 MHz bandwidth.

29. The apparatus according to claim 25, wherein the bandwidth of the WLAN system is 160 MHz or 80+80 MHz, a bit is used to differentiate between two 80 MHz bandwidths, wherein the bit is set to "0" to indicate a first 80 MHz bandwidth, and is set to "1" to indicate a second 80 MHz bandwidth.

30. The apparatus according to claim 25, wherein the frequency domain resource allocation information comprises 7 bits that are used to represent the index.

31. A non-transitory computer-readable media storing computer instructions for a Wireless Local Area Network (WLAN) system resource indication in an access point, that when executed by one or more processors, cause the one or more processors to perform the steps of:

receiving a frame that is sent by an access point and that carries resource indication information, wherein the resource indication information comprises multiple pieces of sub resource indication information; and reading pieces of the sub resource indication information;

wherein each piece of the sub resource indication information comprises: an identifier of one station of the multiple stations and frequency domain resource allocation information of the one station;

wherein the frequency domain resource allocation information indicates a size and a location of one frequency domain resource unit RU in a bandwidth of the WLAN system; and wherein the frequency domain resource allocation information comprises one index, for different bandwidths of the WLAN system, the index is one of multiple indexes, and the multiple indexes comprise:

indexes "0-36", each of which indicates a RU of 26 tones allocated to the one station;

indexes "37-52", each of which indicates a RU of 52 tones allocated to the one station;

indexes "53-60", each of which indicates a RU of 106 tones allocated to the one station;

indexes "61-64", each of which indicates a RU of 242 tones allocated to the one station;

indexes "65-66", each of which indicates a RU of 484 tones allocated to the one station.

32. The non-transitory computer-readable media according to claim 31, wherein the bandwidth of the WLAN system is 20 MHz, sizes of frequency domain resource units comprise 26 tones, 52 tones, 106 tones, and 242 tones;

wherein nine of the indexes "0-36" are used for the RUs of 26 tones located in the 20 MHz bandwidth;

wherein four of the indexes "37-52" are used for the RUs of 52 tones located in the 20 MHz bandwidth;

wherein two of the indexes "53-60" are used for the RUs of 106 tones located in the 20 MHz bandwidth; and wherein one of the indexes "61-64" is used for the RU of 242 tones located in the 20 MHz bandwidth.

33. The non-transitory computer-readable media according to claim 31, wherein the bandwidth of the WLAN system is 40 MHz, sizes of frequency domain resource units comprise 26 tones, 52 tones, 106 tones, 242 tones, and 484 tones;

wherein eighteen of the indexes "0-36" are used for the RUs of 26 tones located in the 40 MHz bandwidth;

wherein eight of the indexes "37-52" are used for the RUs of 52 tones located in the 40 MHz bandwidth;

wherein four of the indexes "53-60" are used for the RUs of 106 tones located in the 40 MHz bandwidth;

wherein two of the indexes "61-64" are used for the RUs of 242 tones located in the 40 MHz bandwidth; and wherein one of the indexes "65-66" is used for the RU of 484 tones located in the 40 MHz bandwidth.

34. The non-transitory computer-readable media according to claim 31, wherein the bandwidth of the WLAN system is 80 MHz, 160 MHz or 80+80 MHz, sizes of frequency domain resource units comprise 26 tones, 52 tones, 106 tones, 242 tones and 484 tones;

wherein thirty-seven of the indexes "0-36" are used for the RUs of 26 tones located in a 80 MHz bandwidth;

wherein sixteen of the indexes "37-52" are used for the RUs of 52 tones located in a 80 MHz bandwidth;

wherein eight of the indexes "53-60" are used for the RUs of 106 tones located in a 80 MHz bandwidth;

wherein four of the indexes "61-64" are used for the RUs of 242 tones located in a 80 MHz bandwidth; and wherein two of the indexes "65-66" are used for the RUs of 484 tones located in a 80 MHz bandwidth.

35. The non-transitory computer-readable media according to claim 31, wherein the bandwidth of the WLAN system is 160 MHz or 80+80 MHz, a bit is used to differentiate between two 80 MHz bandwidths, wherein the bit is set to "0" to indicate a first 80 MHz bandwidth, and is set to "1" to indicate a second 80 MHz bandwidth.

36. The non-transitory computer-readable media according to claim 31, wherein the frequency domain resource allocation information comprises 7 bits that are used to represent the index.

* * * * *